United States Patent
Ross et al.

(10) Patent No.: US 7,378,675 B2
(45) Date of Patent: May 27, 2008

(54) SECURITY MARKERS FOR INDICATING CONDITION OF AN ITEM

(75) Inventors: Gary A. Ross, Edinburgh (GB);
Graham I. Johnson, Scotland (GB);
Barrie Clark, Scotland (GB); Simon J. Forrest, Scotland (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/265,703

(22) Filed: Nov. 2, 2005

(65) Prior Publication Data
US 2006/0118741 A1    Jun. 8, 2006

Related U.S. Application Data

(63) Continuation-in-part of application No. 11/016,658, filed on Dec. 17, 2004, which is a continuation-in-part of application No. 10/822,582, filed on Apr. 12, 2004.

(30) Foreign Application Priority Data
Jun. 26, 2003 (GB) ................... 0314883.0

(51) Int. Cl.
*G01J 1/58* (2006.01)
*G01N 21/64* (2006.01)

(52) U.S. Cl. ............... 250/559.39; 250/559.44; 250/484.4; 250/486.1

(58) Field of Classification Search .......... 250/556, 250/221, 222.1, 492.1, 492.22, 483.1, 484.4, 250/486.1, 559.39, 559.44; 356/71; 252/301.16, 252/301.34–301.36, 301.4 R, 301.4 F; 106/31.15, 106/31.64, 31.32; 283/72–74, 92, 94–96, 283/117, 901; 428/195.1, 690; 209/534; 194/206, 207, 211–214, 328, 330, 353; 382/112, 382/135–137; 152/154.2
See application file for complete search history.

(56) References Cited

U.S. PATENT DOCUMENTS

| 3,412,245 | A | 11/1968 | Halverson |
| 3,473,027 | A | 10/1969 | Freeman et al. |
| 3,582,623 | A | 6/1971 | Rothery et al. |
| 3,650,400 | A | 3/1972 | Warren et al. |
| 3,666,946 | A | 5/1972 | Trimble |
| 4,047,033 | A | 9/1977 | Malmberg et al. |
| 4,451,521 | A | 5/1984 | Kaule et al. |
| 4,736,425 | A | 4/1988 | Jalon |

(Continued)

FOREIGN PATENT DOCUMENTS

| EP | 0 700 980 | 3/1996 |
| EP | 1 116 775 | 7/2001 |
| EP | 1 117 060 | 7/2001 |
| FR | 2 556 867 | 6/1985 |
| GB | 2 258 659 | 2/1993 |
| WO | WO 97/10307 | 3/1997 |
| WO | WO 00/27645 | 5/2000 |
| WO | WO 03/105075 | 12/2000 |

OTHER PUBLICATIONS

See 1 in Addendum.

(Continued)

*Primary Examiner*—John R. Lee
(74) *Attorney, Agent, or Firm*—Charles Q. Maney

(57) ABSTRACT

A method of indicating the condition of an item comprises illuminating the item to excite one or more photoluminescent markers incorporated within the item. Photoluminescent emission from the markers in response to the excitation is compared to one or more pre-defined photoluminescent signatures indicating different conditions of the item.

5 Claims, 28 Drawing Sheets

U.S. PATENT DOCUMENTS

| | | |
|---|---|---|
| 5,786,219 A | 7/1998 | Zhang et al. |
| 5,837,042 A | 11/1998 | Lent et al. |
| 6,165,592 A | 12/2000 | Berger et al. |
| 6,211,526 B1 | 4/2001 | Huston et al. |
| 6,344,261 B1 | 2/2002 | Kaule et al. |
| 6,383,618 B1 | 5/2002 | Kaule et al. |
| 6,479,133 B1 | 11/2002 | Kaule et al. |
| 6,503,603 B1 | 1/2003 | Kaule et al. |
| 6,506,476 B1 | 1/2003 | Kaule et al. |
| 6,576,155 B1 | 6/2003 | Barbera-Guillem |
| 6,613,137 B2 | 9/2003 | Egger et al. |
| 6,777,948 B2 * | 8/2004 | Dominelli et al. .......... 324/455 |
| 6,966,998 B1 | 11/2005 | Spowart |
| 2003/0081203 A1 * | 5/2003 | Chen et al. ................. 356/300 |
| 2003/0143426 A1 * | 7/2003 | Haneda et al. .............. 428/690 |
| 2004/0031931 A1 | 2/2004 | Muller et al. |
| 2004/0084120 A1 * | 5/2004 | Arnold et al. .............. 152/151 |
| 2004/0171076 A1 | 9/2004 | Dejneka et al. |
| 2004/0227112 A1 | 11/2004 | Howard |
| 2005/0178841 A1 | 8/2005 | Jones et al. |

OTHER PUBLICATIONS

See 2 in Addendum.
Patent Abstracts of Japan, vol. 2000, No. 24, May 11, 2001 & JP 2001 2006959 A (Toppan Printing Co. Ltd), Jul. 31, 2001.
See 3 in Addendum.
"Microscopic Glass Ribbons Provide Molecular Labels-Materials Science-Brief Article" Science News: Copyright 2003 Science Service, Inc., Copyright 2003 Gale Group.
See 4 in Addendum.
See 5 in Addendum.

* cited by examiner

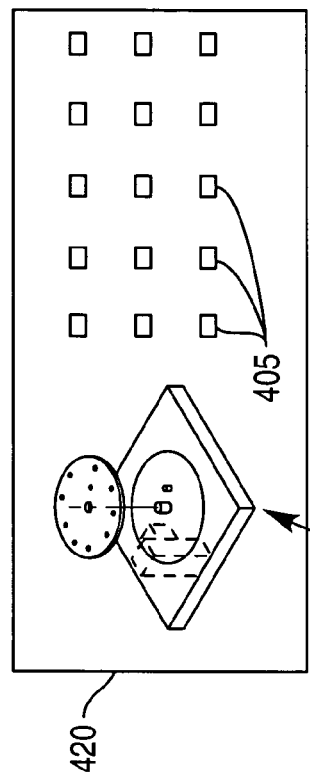
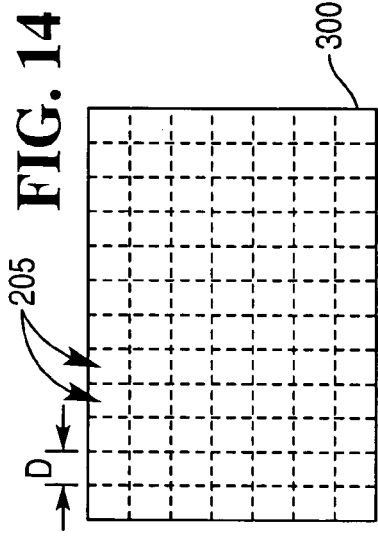
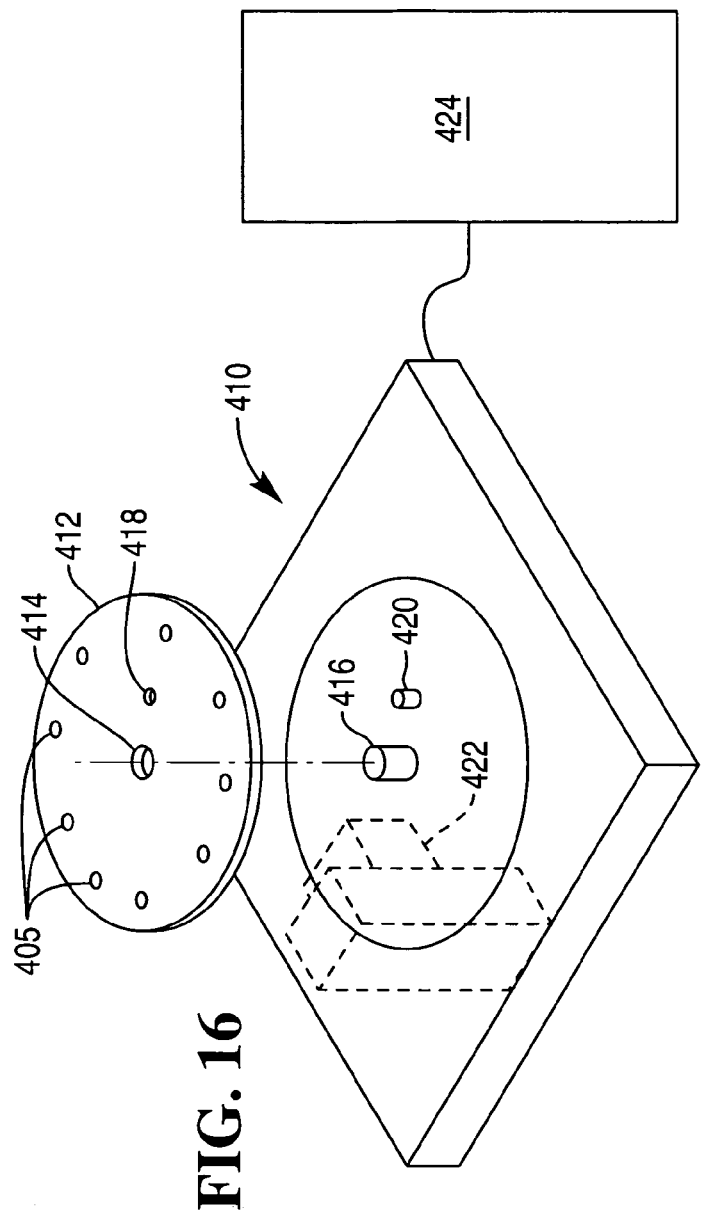

FIG. 18 : EUROPIUM IN BOROSILICATE BASED GLASS

| EXCITATION WAVELENGTH (nm) | EMISSION WAVELENGTH (nm) | EMISSION INTENSITY |
|---|---|---|
| 395 | 535 | 14.433 |
| 395 | 590.5 | 82.873 |
| 395 | 615 | 285.211 |
| 395 | 654 | 13.332 |
| 415 | 590.5 | 11.469 |
| 415 | 615 | 30.916 |
| 465 | 615 | 175.781 |
| 465 | 590.5 | 38.013 |
| 535 | 615 | 28.495 |

FIG. 19 : EUROPIUM IN AQUEOUS SOLUTION

| EXCITATION WAVELENGTH (nm) | EMISSION WAVELENGTH (nm) | EMISSION INTENSITY |
|---|---|---|
| 395 | 526 | 1.746 |
| 395 | 536 | 2.495 |
| 395 | 556.5 | 8.633 |
| 395 | 592.5 | 85.608 |
| 395 | 618.5 | 30.277 |
| 415 | - | - |
| 465 | 594 | 2.288 |
| 465 | 616.5 | 0.793 |
| 465 | 700.5 | 3.915 |
| 535 | 592 | 1.126 |

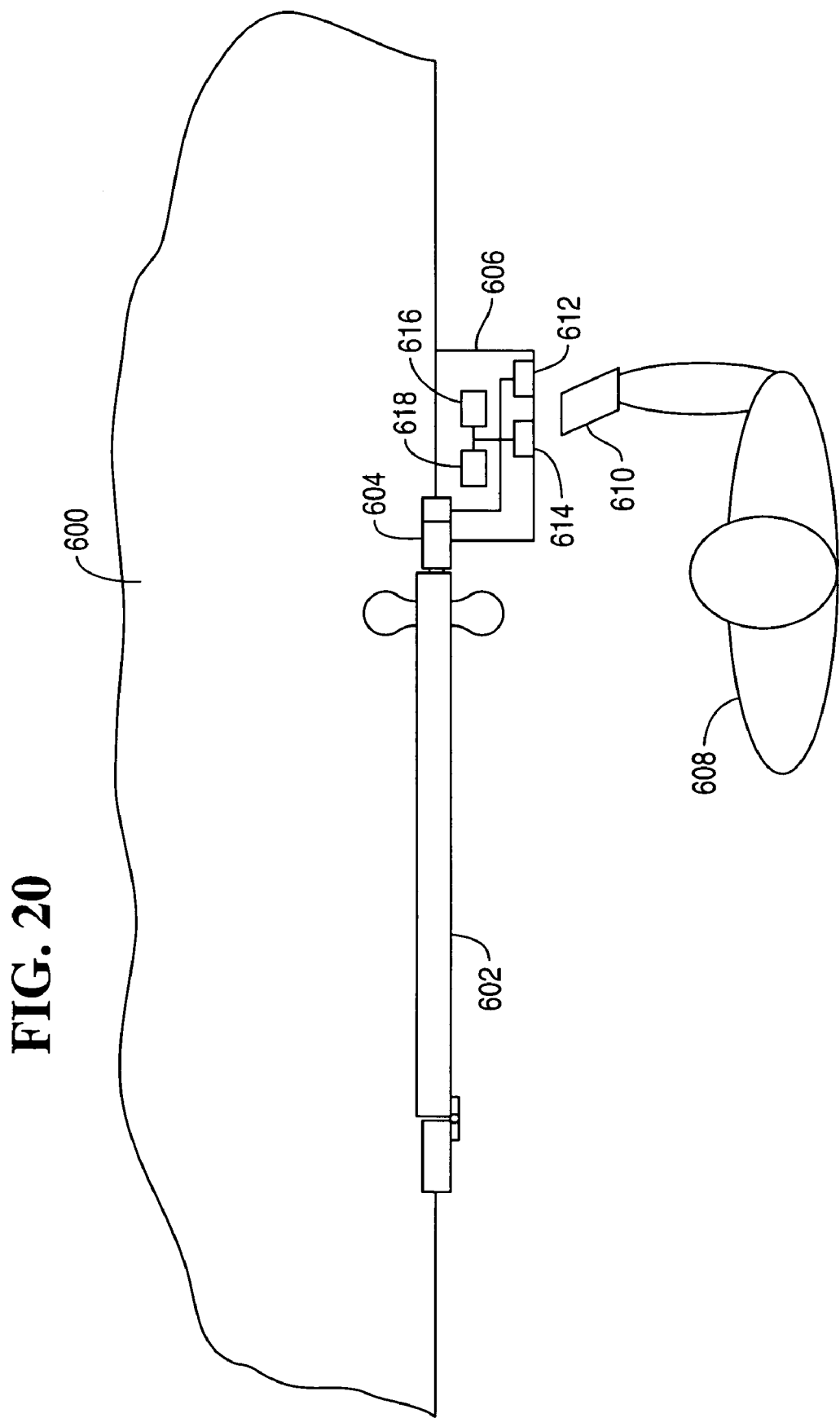

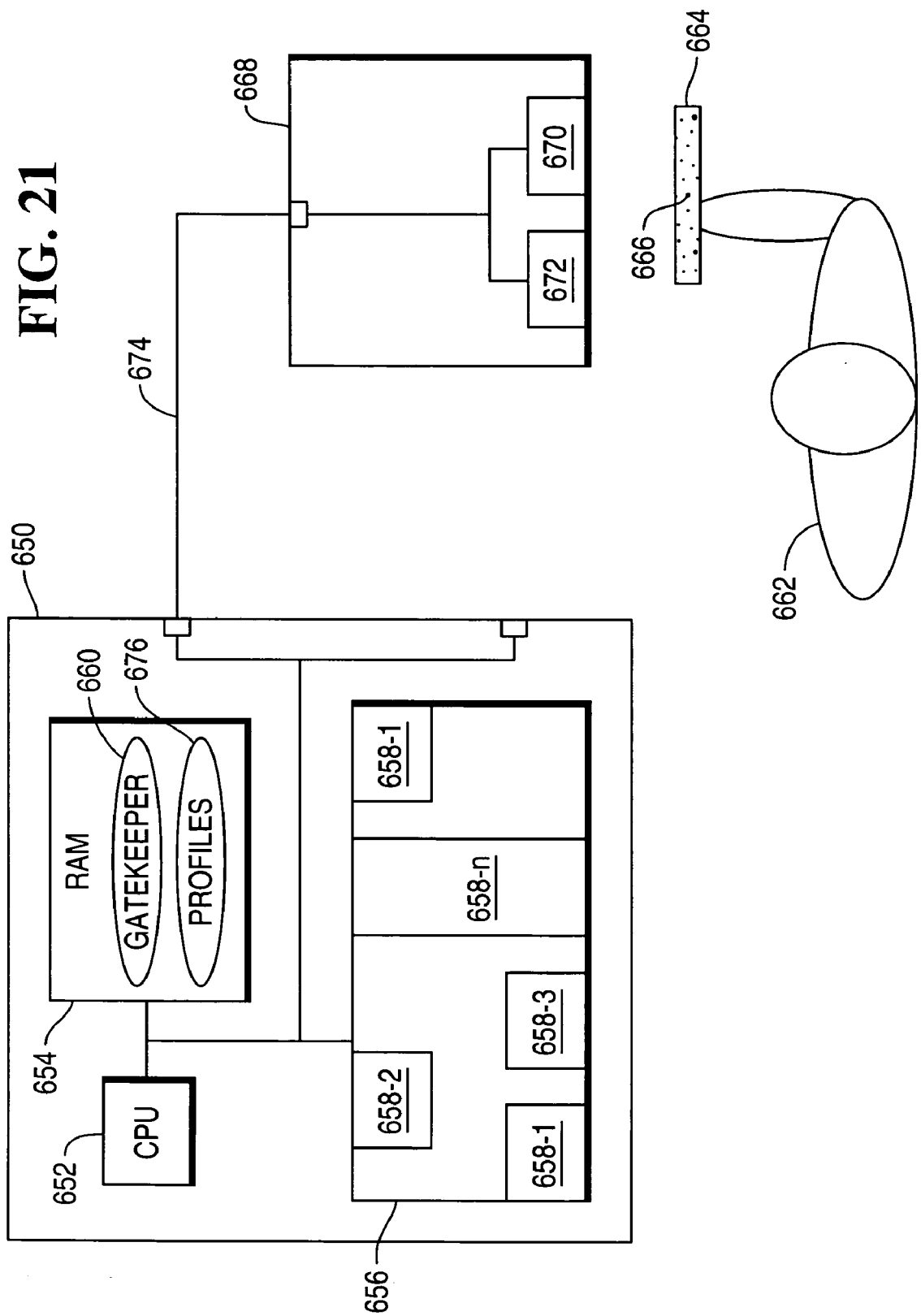

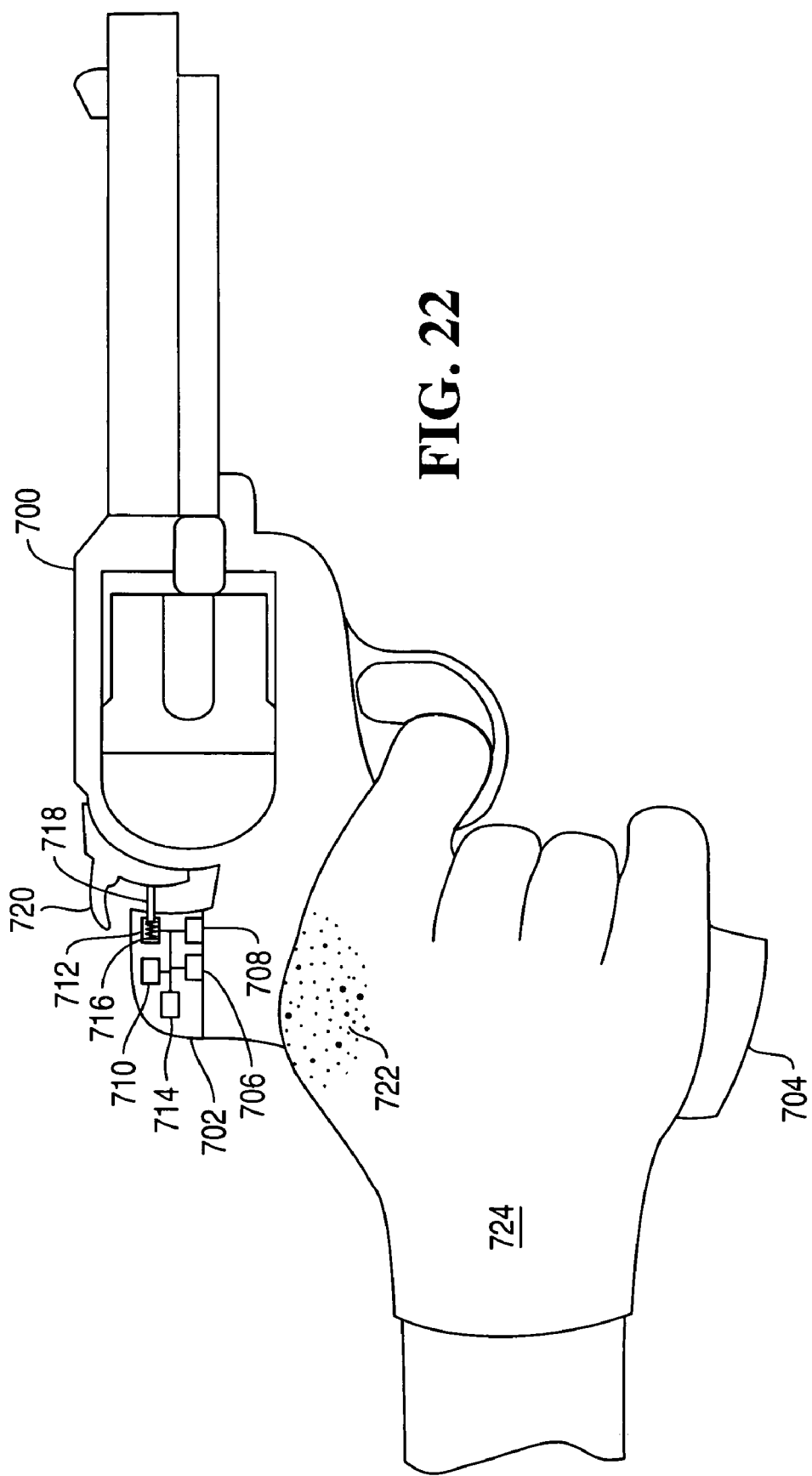

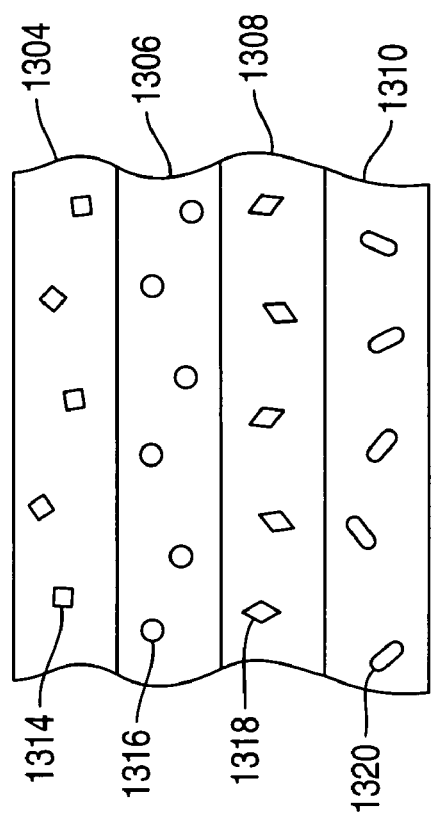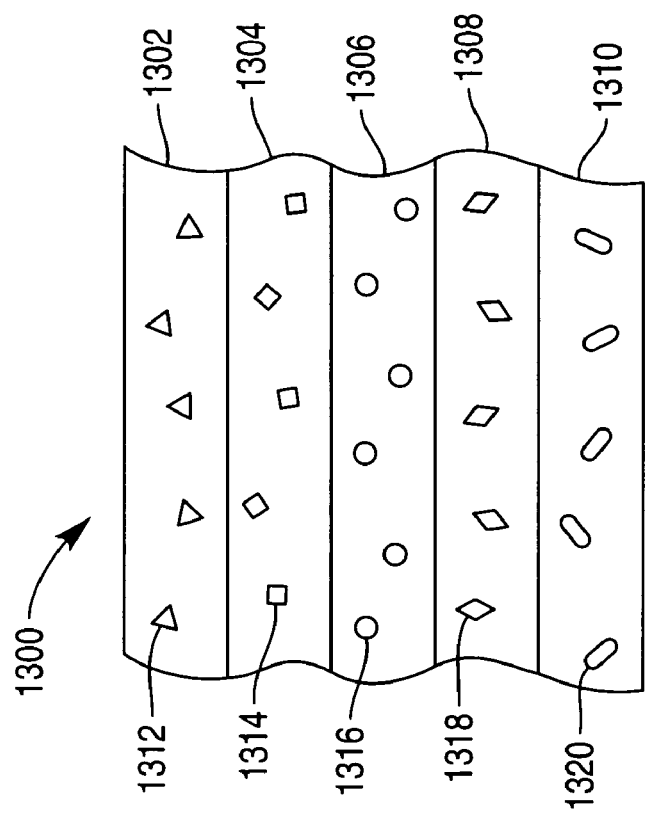

SECURITY MARKERS FOR INDICATING CONDITION OF AN ITEM

This application is a continuation-in-part of application Ser. No. 11/016,658, filed Dec. 17, 2004, now pending, which is a continuation-in-part of application Ser. No. 10/822,582, filed Apr. 12, 2004, now pending.

The present invention relates to security markers which are difficult to counterfeit. The security markers are generally attached to, or embedded in, objects. The security markers provide indicia which can identify their origin and thus the origin of the object.

BACKGROUND OF THE INVENTION

Security markers are used to authenticate items. For example, bank notes typically include security markers such as watermarks, security threads, holograms, kinegrams, and such like. Chemical and biochemical taggants are also used as security markers for items. However, in many cases such taggants must be removed from the item for authentication analysis. This is both time-consuming and expensive.

Optically based approaches, such as those using luminescent or, more commonly, simple fluorescent inks and dyes, are also used to authenticate items. Fluorescent inks and dyes emit light when excited by radiation of a particular wavelength. Information embedded in an item using fluorescent inks and dyes can be retrieved when the embedded mark is illuminated with radiation of an appropriate wavelength.

An example of a particular type of fluorescent ink is described in U.S. Pat. No. 5,256,193, which is hereby incorporated by reference. The following patents describe various security labeling and printing applications, and are hereby also incorporated by reference: JP 8208976; U.S. Pat. Nos. 4,736,425; 5,837,042; 3,473,027; 5,599,578; GB 2,258,659; 6,344,261; and 4,047,033.

Known fluorescent inks and dyes have the disadvantage that they have very broad emissions spectra, which limits the number of different dyes that can be used. For example, one ink may produce a color which spans from red through green in the visible spectrum. Another may produce a color which spans from green through violet. Thus, if these two inks are used in or on an item, it is difficult to use a third ink with them, because the first two inks cover the entire visible spectrum.

For many purposes it is, therefore, desirable to provide security markers having an emission spectrum comprising one or more narrow peaks. Similarly, it is desirable to provide security markers which are inexpensive to manufacture and incorporate in materials, difficult to counterfeit, and quick and easy to detect in situ.

SUMMARY OF THE INVENTION

In one form, a glass composition is fabricated, which produces a unique luminescent signature in response to excitation, and the glass composition is difficult to copy to form a second composition which produces the same unique luminescent signature. More particularly, the glass composition produces a unique photoluminescent (PL) signature in response to excitation, and the glass composition is difficult to copy to form a second composition which produces the same unique PL signature.

As used herein, a luminescent signature refers to aspects of luminescent emission from a security marker or group of markers that are unique to that marker or group of markers. Similarly, a PL signature refers to aspects of PL emission from a security marker or group of markers that are unique to that marker or group of markers. These aspects may include one or more of: presence or absence of emission at one or more wavelengths; presence or absence of a peak in emission at one or more wavelengths; the number of emission peaks within all or a portion of the electromagnetic spectrum comprising, for example, ultraviolet radiation to infrared radiation (e.g., approximately 10 nm to 1 mm); rate of change of emission versus wavelength, and additional derivatives thereof; rate of change of emission versus time, and additional derivatives thereof; absolute or relative intensity of emission at one or more wavelengths; presence or absence of regions of the electromagnetic spectrum, for example ultraviolet radiation to infrared radiation, in which emission is above a predetermined absolute or relative intensity; presence or absence of regions of the electromagnetic spectrum, for example ultraviolet radiation to infrared radiation, in which emission is below a predetermined absolute or relative intensity; ratio of an intensity of one emission peak to an intensity of another emission peak or other emission peaks; the shape of an emission peak; the width of an emission peak; or such like.

According to a first aspect there is provided an optically detectable security marker for emitting light at a predetermined wavelength, the marker comprising: a rare earth dopant and a carrier incorporating the rare earth dopant, the interaction of the carrier and the dopant being such as to provide a PL signature or response that is different from that of the rare earth dopant. As will be appreciated by those of ordinary skill in the art, the term "light" is not restricted to photons in the visible spectrum, but includes photons in the ultraviolet and infrared ranges.

A rare earth dopant comprising one or more rare earth elements has an intrinsic set of electronic energy levels. The interaction between the carrier and the dopant is such that these intrinsic energy levels change when the dopant is incorporated into the carrier. For example, when the dopant is incorporated into a glass, new energy levels (from the glass) are made available for transitions, thus altering the electron arrangement, and hence the energy levels for photon absorption and emission (i.e. photoluminescence). These transitions can assist recombinations that were previously prohibited. Altering the rare earth dopant, dopant chelate and/or the composition and/or structure of the carrier changes these energy levels and hence the observed PL signature.

By virtue of this aspect an optically detectable security marker is provided that can be tailored to have strong PL light emission at a predetermined wavelength when illuminated with a particular wavelength of light. This enables a validator to validate the security marker by detecting emission at the predetermined wavelength in response to radiation at the particular wavelength. Such a security marker is very difficult to replicate by a counterfeiter.

The rare earth dopant may be a lanthanide or a compound comprising a lanthanide.

The carrier may comprise a glass or a plastic. The carrier in which the rare earth dopant is embedded may readily be produced in a variety of formats, e.g. spheres, beads, threads or fibers, suitable for inclusion in a variety of products such as those made from paper, plastic, woven and non-woven textiles, and various composite materials, among others. Alternatively, the rare earth dopant may be an integral part of the substrate or matrix forming the underlying product.

A carrier incorporating one or more rare earth dopants produces narrowband emissions in response to excitation.

Due to these narrow emission bands, multiple carriers can be used (or a single carrier can incorporate multiple rare earth dopants), each prepared to have a different PL signature so that, for example, luminescence peaks at multiple emission wavelengths can be provided in a single item without the different peaks overlapping each other. This enables a security marker to be provided that has a PL signature selected from a large number of permutations, thereby greatly increasing the difficulty in counterfeiting such a security marker.

A carrier incorporating one or more rare earth dopants has a new energy level profile that allows transitions different from those allowed by either the rare earth dopant or the undoped carrier. The new energy level profile results from the unfilled 4 f electron shell in the rare earth ions, which allow f-f electron transitions. The new energy level profile allows atomic luminescence having a narrow peak rather than molecular luminescence that has a broad peak. The new energy level profile is particularly advantageous for security purposes because it provides narrow emissions at wavelengths not naturally found in either the rare earth dopant or the undoped carrier. These narrow emissions can be used as part of a security marker.

A plurality of different rare earth dopants may be used. One or more of these different rare earth dopants may have intrinsic PL emissions that are visible to the unaided human eye, for example in the range of 390-700 nm. Similarly, one or more of these different rare earth dopants may have intrinsic PL emissions that are invisible to the unaided human eye, for example in the infrared or ultraviolet range. Likewise, the combined effect of the carrier and the rare earth dopant may be such as to cause the security marker to have PL emissions that are visible to the unaided eye, or that are invisible to the unaided human eye.

The security marker may be excited by highly selective, high intensity visible light and the resultant emission may be in the visible region or in the infrared region.

It may be desirable to add secondary dopants incorporating, for example, other rare earth elements to a carrier including primary dopants (i.e., those dopants that have already been introduced into the carrier to produce PL emissions at the predetermined wavelength) even though the emissions from these secondary dopants are not conducive to the desired transitions (i.e., PL emissions at the predetermined wavelength). This is because the energy levels of these secondary dopants can contribute to otherwise prohibited transitions. Thus, while the secondary dopants may not produce PL emissions at the predetermined wavelength, they contribute indirectly by strengthening the PL emissions from primary dopants at the predetermined wavelength.

Various ratios and concentrations of dopants have been tested. In one example, the dopant comprised approximately 3 mol %, based upon the total number of moles in the composition. Approximately 1 to 3 mol % has also been tested for single and multi doped beads of glass (i.e., 1 mol % Eu, 1 mol % Th, 1 mol % Dy for 1 bead in steps (of each) of 0.5 mol % up to 3 mol % Eu, 3 mol % Th and 3 mol % Dy). Bead size was approximately 50 micron. One type of glass used has a soft point of about 740 degrees C. The exact melting point depends on the specific glass used, and may vary from 700 degrees C. to 1500 degrees C. For some embodiments, efficiency may level off for doping above 3 mol %.

Different methods of doping glass with rare earth elements are known. The following patents or published applications describe various doping methods, and are hereby incorporated by reference: U.S. Pat. Nos. 6,153,339; 5,262,365; and U.S. Published application 2004/0212302.

Glass beads have been fabricated and tested (PL spectra has been measured) for beads varying from 5 μm in diameter to 100 μm in diameter. Beads having a particular size can be specifically produced or passed through a sieve having appropriate apertures/reticulations.

According to a second aspect of the present invention there is provided an item having an optically detectable security feature for emitting light at a predetermined wavelength, the security feature comprising: a rare earth dopant and a carrier incorporating the rare earth dopant, the interaction of the carrier and the dopant being such as to provide a PL signature or response that is different from that of the rare earth dopant.

The item may be validated by illuminating the security feature at one or more wavelengths and detecting emissions at the predetermined wavelength.

The item may be a fluid. Examples of fluids particularly suitable for use with the invention include fuel, paint, ink and such like.

The item may be a laminar media item. The laminar media item may be in the form of a web, a sheet, and such like. Examples of sheet form laminar media items include banknotes and financial instruments such as checks, giros, and money orders.

The item may include a plurality of security features, each emitting light at a different predetermined wavelength. Alternatively, an individual security feature may include a plurality of rare earth dopants.

In one embodiment, an item may include a plurality of security features each having different concentrations of dopant, so that intensities of the predetermined wavelength emissions are different. By virtue of this aspect, the relative emission intensity of different predetermined wavelengths can be used as an additional layer of security for an item. For example, intensity of one predetermined wavelength may be 100, intensity of another predetermined wavelength 50, intensity of a third predetermined wavelength 25, and intensity of a fourth predetermined wavelength 50. More or less than four wavelengths can be used. This provides a large variety of security profiles, where each profile comprises PL emission at a plurality of predetermined wavelengths and a ratio of intensities at the plurality of wavelengths. This makes counterfeiting even more difficult, as the quantities of each dopant must be accurately replicated, in addition to the carrier energy difference.

In another embodiment, the PL emission from each security feature decays over a different time period. By virtue of this aspect, the time over which emission occurs at a particular wavelength can also be used as part of a security profile.

According to a third aspect there is provided a system for validating an item having an optically detectable security feature emitting light at one or more predetermined wavelengths, where the security feature comprises a carrier incorporating a rare earth dopant, the system comprising: means for illuminating the security feature with one or more wavelengths for producing emissions from the security feature; means for detecting emission from the security feature at at least one of the one or more predetermined wavelengths; means for filtering and comparing the detected emission with a security profile for the item; and means for indicating a successful validation in the event of the emission matching the security profile.

The means for illuminating the item may comprise a pulsed light emitting diode, a laser diode, or a broadband light source and, optionally, an illumination filter for ensuring that only a narrow band of wavelengths illuminate the item.

The means for detecting emission may comprise a detection filter to filter out all wavelengths except the predetermined wavelength, and a photodiode to detect the intensity of light passing through the detection filter.

In one embodiment, the illumination means comprises an array of LEDs, each LED having a different illumination filter, so that the item to be validated is illuminated with multiple narrow band wavelengths. In such an embodiment, the detection means comprises an array of photodiodes, each photodiode having a different detection filter, so that the emission at each corresponding, predetermined wavelength can be determined.

According to a fourth aspect there is provided a method of validating an item having an optically detectable security feature comprising a carrier incorporating a rare earth dopant emitting light at one of a plurality of predetermined wavelengths, the method comprising the steps of: illuminating the security feature with light at one or more wavelengths; detecting emission from the security feature at a predetermined wavelength; filtering and comparing the detected emission with a security profile for the item; and indicating a successful validation in the event of the emission matching the security profile.

According to a fifth aspect there is provided an optically detectable security marker for emitting light at a predetermined wavelength, the marker comprising: a rare earth dopant incorporated within a carrier material, the dopant and the carrier material being such as to cause emission of visible light in response to excitation by visible light of a predetermined wavelength.

The interaction of the carrier and the dopant may be such as to provide a PL signature or response that is different from that of the rare earth dopant.

According to a sixth aspect there is provided a security item that includes an optically detectable security marker for emitting light at one or more predetermined wavelengths, the marker comprising: a rare earth dopant incorporated within a carrier material, the dopant and the carrier material being such as to cause emission of visible light in response to excitation by visible light.

The security item may be a fluid, for example fuel, paint, ink and such like. Alternatively the security item may be a laminar media item, for example banknotes and financial instruments such as checks.

The security item may include a plurality of security markers, each marker emitting light at one or more different predetermined wavelengths.

According to a seventh aspect there is provided a security marker comprising a glass, such as a borosilicate based glass, or a plastic, and a rare earth dopant. The glass may include $SiO_2$; $Na_2O$; $CaO$; $MgO$; $Al_2O_3$; $FeO$ and/or $Fe_2O_3$; $K_2O$, and $B_2O_3$, and the rare earth dopant may comprise a lanthanide. The glass may have a composition of: $SiO_2$ 51.79 wt %; $Na_2O$ 9.79 wt %; $CaO$ 7.00 wt %; $MgO$ 2.36 wt %; $Al_2O_3$ 0.29 wt %; $FeO$, $Fe_2O_3$ 0.14 wt %; $K_2O$ 0.07 wt %, and $B_2O_3$ 28.56 wt %, not precluding the use of other glass mixes. The security marker comprising the glass and the rare earth dopant may be formed into micro-beads.

The security marker may further comprise a carrier, such as glass or plastic including one or more types of rare earth dopant. The interaction of the glass or plastic and the dopant may be such that the PL signature or response of the marker is different from that of the rare earth dopant or the carrier. In particular, the interaction between the carrier and the dopant may be such that the intrinsic energy levels of the dopant change when it is incorporated into the carrier. For example, when the dopant is incorporated into a glass, new bonds are formed in the doped glass, thus altering the electron arrangement and hence the energy levels of absorption and PL emission. Altering the rare earth dopant, dopant chelate and/or the composition and/or structure of the carrier changes these energy levels and hence the observed PL signature. A currently preferred dopant is any of the lanthanides except Lanthanum.

The rare earth doped glass may be formed into microbeads that can be included in, for example, a fluid such as ink.

According to an eighth aspect there is provided a kit comprising a) a collection of samples derived from a single batch of material comprising a rare earth dopant and a carrier, all of the collection of samples producing a common PL signature when illuminated by a set of excitation frequencies, and b) a scanner for illuminating a test sample with the set of excitation frequencies and ascertaining whether the test sample produces the PL signature.

The scanner may include data indicating the PL signature, and may compare a PL signature obtained from the test sample with the data.

The scanner, using one of the collection of samples as a reference, may obtain a PL signature from the reference, obtain a PL signature from the test sample, and compare the two signatures.

As used herein, the word "dopant" refers to (i) additives (for example rare earth elements) introduced to carrier components before the carrier (for example, glass) is produced, so that when the carrier is produced it contains the additives, which is referred to herein as a "pre-production dopant"; and/or (ii) additives introduced to the carrier after the carrier is produced, so that the carrier is produced without the additives present, which is referred to herein as a "post-production dopant". Thus, the term dopant covers additives introduced before (pre-production) or after (post-production) the carrier is produced.

Several methods for doping standard glass compositions with selected rare earth dopants can be employed. In one method, test samples of doped glass are prepared by the incorporation of the rare earth dopants into the pre-production batch composition using the appropriate metal salt. The glass is prepared by heating the batch in a platinum crucible to above the melting point of the mixture. In another method, existing, post-production standard glass samples are powdered and mixed with solvent solutions of the rare earth dopants. The glass is then lifted out of the solvent, washed and oven dried.

An example of a glass that could be used as the carrier material for the rare earth dopants is a borosilicate based glass. In particular, a glass that could be used is as follows: $SiO_2$ 51.79 wt %; $Na_2O$ 9.79 wt %; $CaO$ 7.00 wt %; $MgO$ 2.36 wt %; $Al_2O_3$ 0.29 wt %; $FeO$, $Fe_2O_3$ 0.14 wt %; $K_2O$ 0.07 wt %, and $B_2O_3$ 28.56 wt %. This can be made by ball milling soda lime beads for 5 minutes to create a powder to help melting and mixing. Then 5 g of the milled soda lime beads, 2g of the $B_2O_3$ and 3 mol% of the rare earth dopant, for example Europium, Dysprosium and Terbium but also others, are ball milled together for, for example, 3 minutes. The resulting powder is then put in a furnace and heated up to 550° C. It is left in the furnace at this temperature for about 30 minutes, to ensure that the boric oxide is completely melted. Then the temperature is increased to 1100° C. for 1 hour to produce a homogeneous melt. The temperature is increased again to 1250° C. and the molten glass is poured into a brass mold, which is at room temperature, which quenches the glass to form a transparent, bubble free borosilicate glass, doped with rare earth ions.

The peak emission wavelength for PL emission of a security marker comprising a glass carrier incorporating a rare earth dopant depends on the energy levels of the final rare earth doped glass. Altering the weight percentage of the network modifier oxides within the glass matrix will change these levels and hence change the observed peak wavelength. Hence, to observe the correct PL signature, the glass composition has to be known. Likewise, where two or more rare earth dopants are used in a single carrier, varying the ratios, by mole percentage, of the dopants changes the emission intensity at a given wavelength. Peak intensities can be used as part of an encoding scheme and so by varying the dopant levels, there is provided an opportunity to provide even more encoding options.

BRIEF DESCRIPTION OF THE DRAWINGS

FIG. 14 illustrates a carrier on which glass particles can represent data.

FIG. 15 illustrates a kit.

FIG. 16 illustrates a scanner.

FIG. 18 is a table showing various excitation wavelengths and corresponding emission wavelengths and intensities for a Europium dopant in a borosilicate based glass.

FIG. 19 is a table showing various excitation wavelengths and corresponding emission wavelengths and intensities for a Europium dopant in aqueous solution.

FIG. 20 illustrates a person accessing a physical space using an item incorporating glass particles.

FIG. 21 illustrates a person accessing logical stores of a personal computer using an item incorporating glass particles.

FIG. 22 illustrates a gun operable when presented with glass particles having a predetermined luminescence.

FIG. 30a illustrates an item incorporating a different type of glass particle at each of five layers of the item.

FIG. 30b illustrates the item of FIG. 30a after an outermost of the five layers has been uniformly worn away.

DETAILED DESCRIPTION OF THE INVENTION

Figure 1:
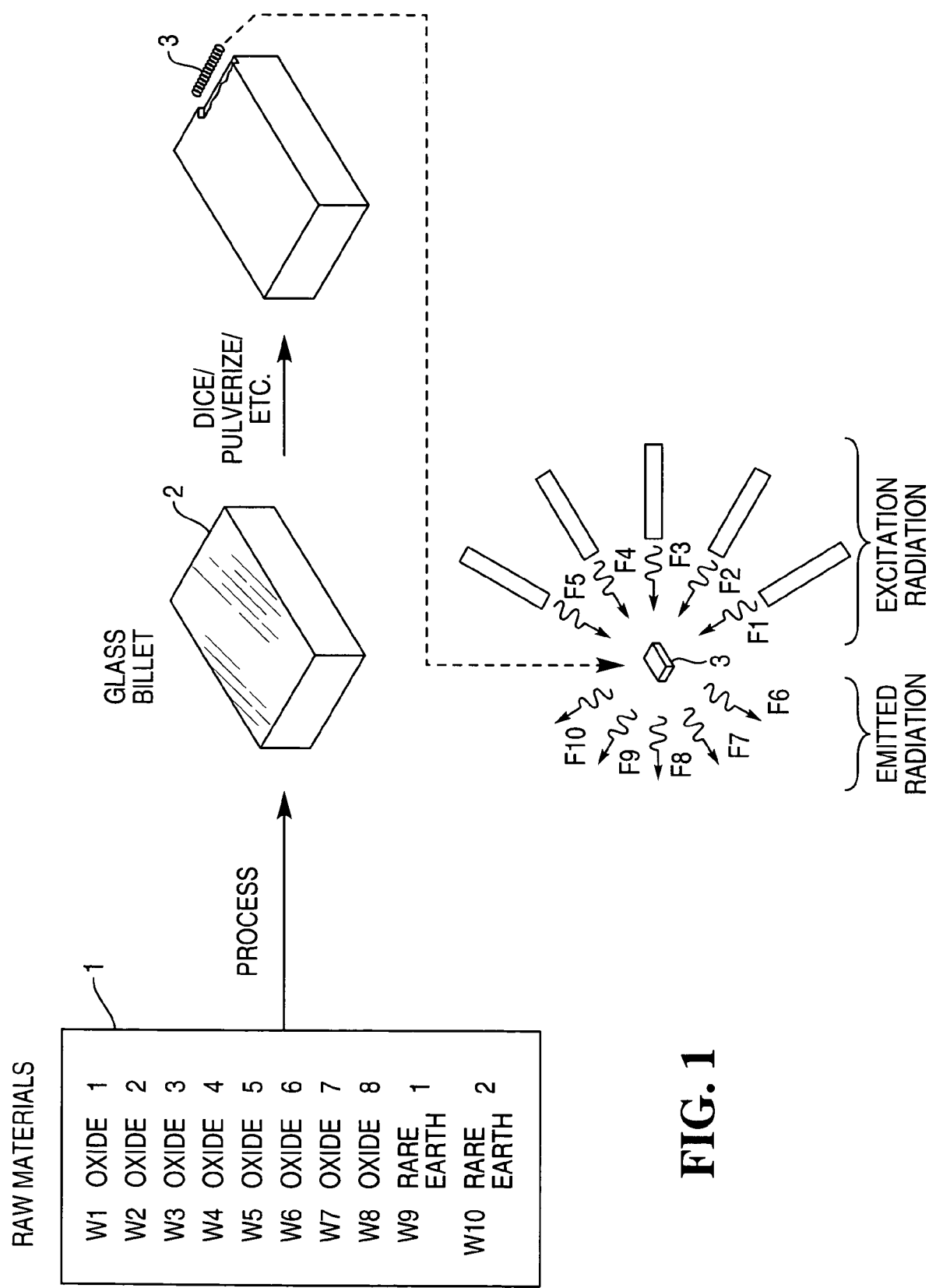
FIG. 1 illustrates manufacture of a security marker in the form of a rare earth doped glass billet having a unique PL signature according to one embodiment of the invention.

Reference is first made to FIG. 1, which illustrates processing steps to produce a security marker according to one embodiment of the present invention.

Block 1 in FIG. 1 illustrates a collection of two types of raw materials: (1) a group of oxides and (2) one or more rare earth elements. The labels W, such as W1, indicate that each raw material is present in a specific weight. Thus, the collective labels W1-W10 indicate a specific composition, by weight, of the raw materials.

Once combined, the raw materials are heated, cooled, and may be subject to heat treatment including, optionally, annealing, as indicated by the arrow labeled PROCESS, to produce a glass billet 2. The glass billet 2 is then cut into dice, pulverized into a powder, or otherwise processed into any other desirable shape or size, as indicated by the arrow labeled DICE/PULVERIZE/ETC. For example, the glass billet 2 can be broken down into many small pieces alternately and interchangeably referred to herein as glass fragments or particles, and the like, which can be used as security markers.

The dashed arrow points to a block 3 which represents one of the dice, a collection of the powder, or another desirable form prepared from the glass billet 2. In the general case, when the block 3 is excited by radiation, indicated by frequencies F1 through F5, the block 3 will emit specific frequencies, indicated by frequencies F6 through F10.

The specific emitted frequencies, and also the properties of those emitted frequencies, are unique to the specific glass billet 2 from which the block 3 is derived. The properties of the emitted frequencies are described in detail below, but include (1) intensity of each emitted frequency and (2) decay rate of each emitted frequency.

In general, if the relative weights W are altered, different emitted frequencies, with different properties, will be detected. Also, if the processing of the glass billet 2, including any annealing, is changed, then different emitted frequencies, with different properties, can also be detected, even if the elemental compositions of two billets 2 are identical.

Therefore, in the general case, the emitted frequencies and their properties, obtained from a given set of excitation frequencies, depend on (1) the composition, that is, the relative weights W, and (2) the processing, including annealing (if any) of the glass billet 2.

Figure 2:
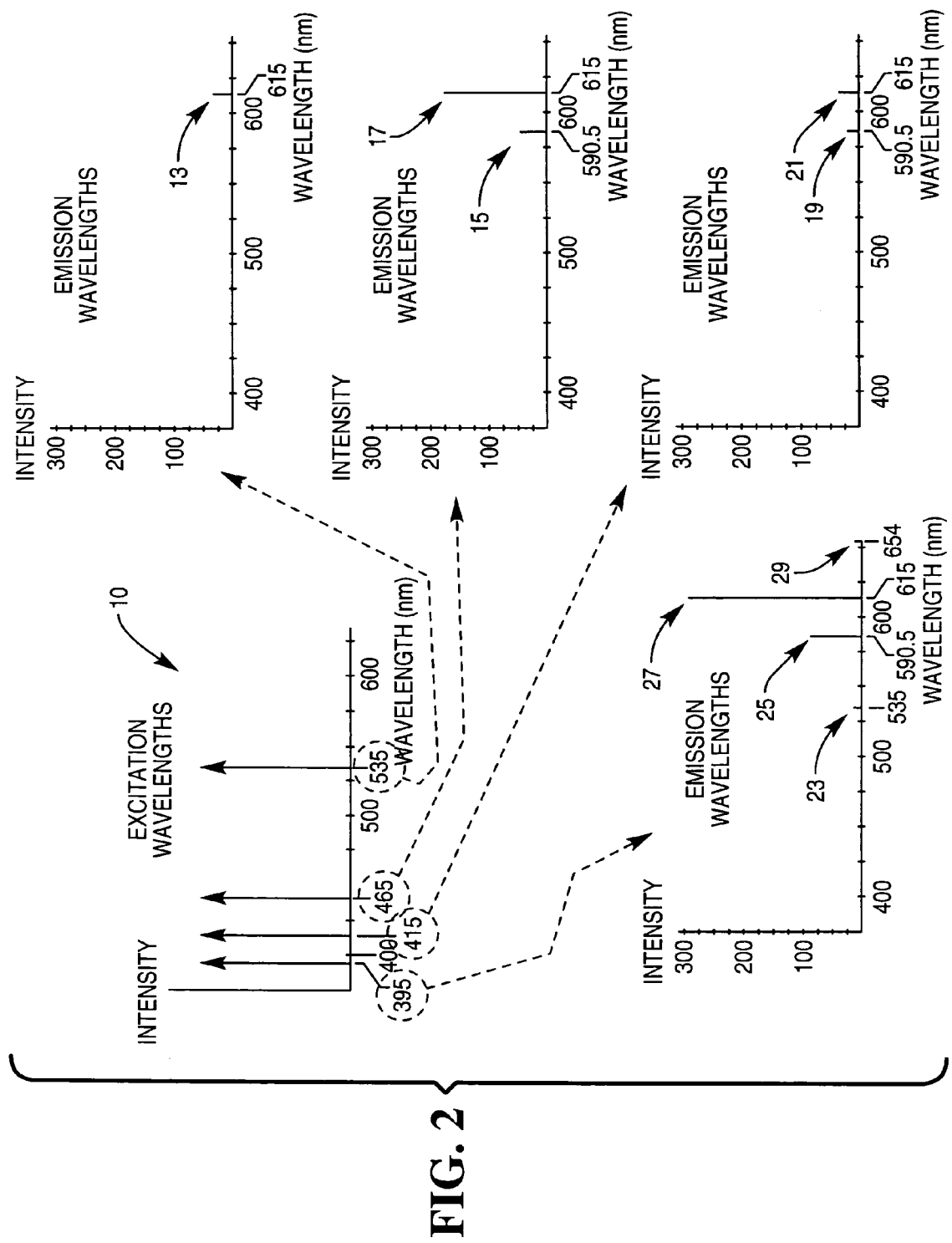
FIG. 2 illustrates the response of a particular rare earth doped glass billet to excitation radiation.

FIG. 2 illustrates a generalized example of the response of a particular glass billet 2 to excitation radiation, and is based on FIG. 18, which will be described later. Graph 10 of FIG. 2 indicates the use of four excitation wavelengths, at 395, 415, 465, and 535 nanometers (nm) of similar intensity. For the glass billet in question, the 535 nm excitation produces one emitted wavelength 13 of indicated relative intensity. The 465 nm excitation produces two emitted wavelengths 15 and 17, of indicated intensities.

The 415 nm excitation also produces two emitted wavelengths 19 and 21, of indicated relative intensities. Finally, the 395 nm excitation produces four emitted wavelengths 23, 25, 27, and 29, of indicated relative intensities. FIG. 18 sets forth the respective relative intensities more precisely, in numerical form.

Figure 3:
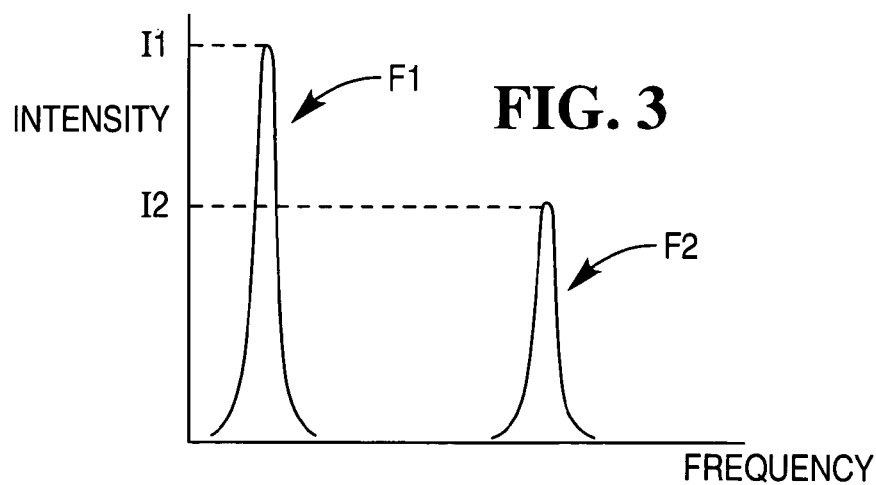
FIG. 3 illustrates a general principle that an excitation frequency will produce at least one emitted, or response, frequency.

FIG. 3 illustrates a general principle that an excitation frequency F1 will produce at least one emitted, or response, frequency F2. Response frequency F2 is characterized by an initial intensity I2, in this case shown to be less than intensity I1 of excitation frequency F1. However, initial intensity I2 of response frequency F2 may be greater than or equal to intensity I1 of excitation frequency F1, depending upon, for example, the composition and processing of the glass.

Figure 4:
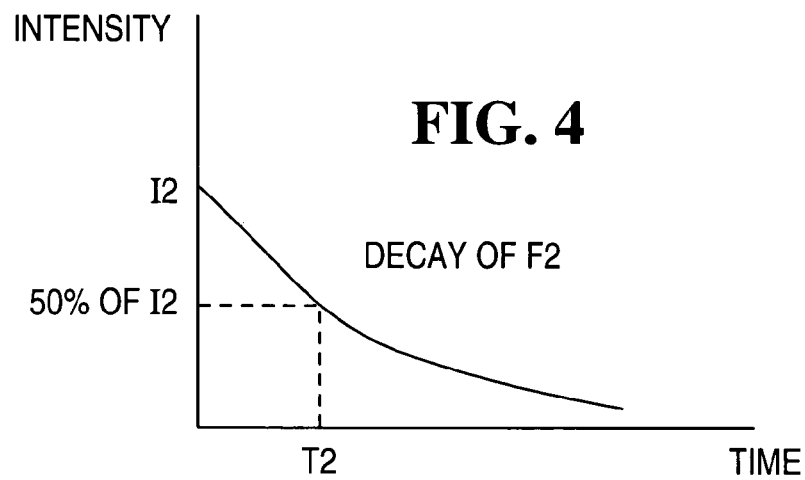
FIG. 4 illustrates decay over time of the response frequency of FIG. 3.

Also, as indicated in FIG. 4, intensity of response of frequency F2 may be characterized by a decay time T2, which is, for example, the time required for the emitted intensity to decay to 50 percent of its initial value I2. However decay time T2 may be alternately defined as, for example, the time required for the emitted intensity to decay to 25 percent of its initial value I2, and the like.

Figure 5:
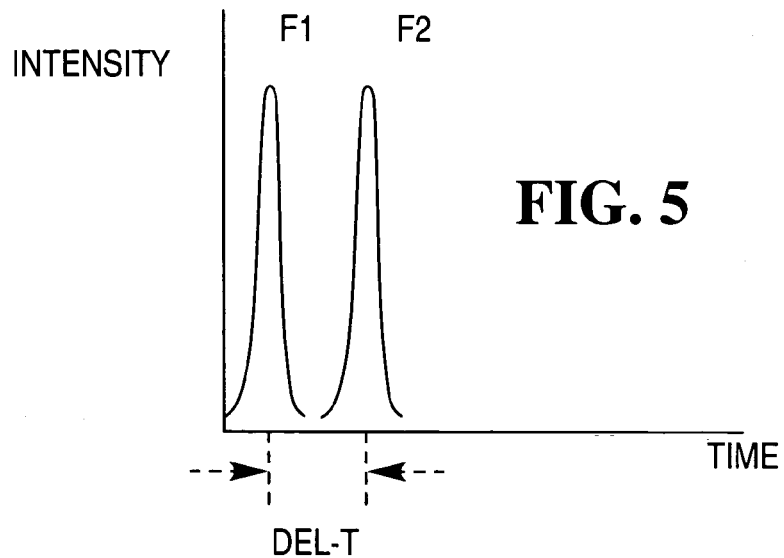
FIG. 5 illustrates a time delay between excitation and response.

In addition to the decay time T2, another time interval may be present, such as that shown in FIG. 5. As shown in FIG. 5, the response frequency F2 may occur after a time interval DEL-T following excitation at frequency F1. The delay time DEL-T may also be a property of the output frequency F2, and used to identify the glass billet.

In addition, the delay time DEL-T can be used to solve a particular problem which can arise. As shown in FIG. 2, the excitation wavelength of 395 nm produces luminescence peaks at four response wavelengths, one of which 23 is at 535 nm. However, the luminescence peak at 535 nm corresponds to an excitation wavelength of the same value. Thus, if the four excitation wavelengths in graph 10 were applied simultaneously, a problem could arise in determining whether a detected signal at a wavelength of 535 nm was caused by the excitation at that wavelength, or by the response 23.

One solution to this problem is to utilize the time delay DEL-T of FIG. 5. The excitation wavelengths are applied, removed (for example, de-activated), and then a detector is activated after DEL-T expires. This ensures that if a signal at wavelength 535 nm is detected, it is not due to an excitation at that wavelength.

Figure 6:
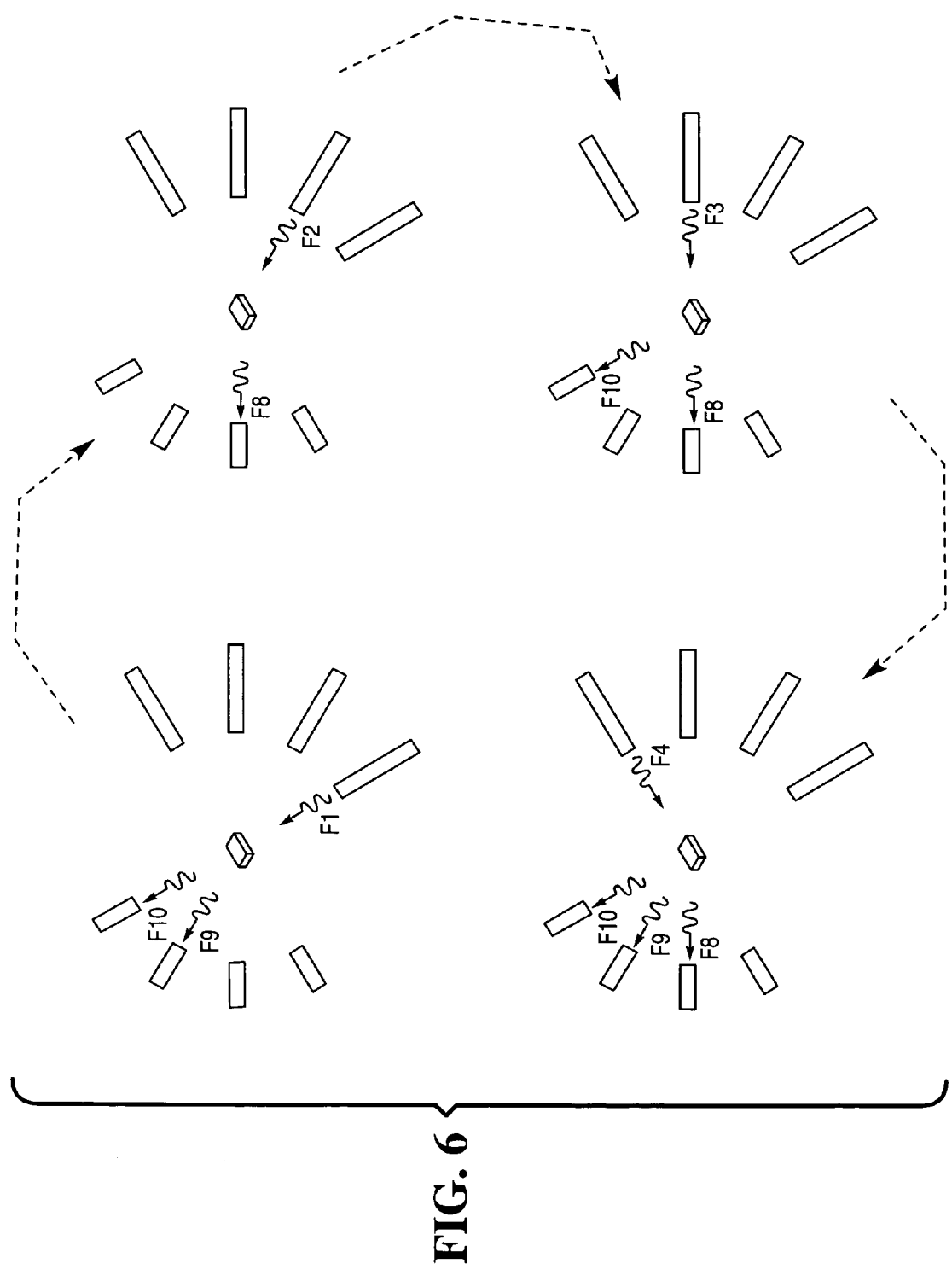
FIG. 6 illustrates sequential excitation by four excitation frequencies.

In addition, another solution to the problem would be to sequentially apply the excitations, as indicated by the sequence F1 through F4 in FIG. 6. When each excitation of a specific frequency is applied, a detector looks for a response, either at the same time, or after a delay such as DEL-T in FIG. 5.

Figure 7:
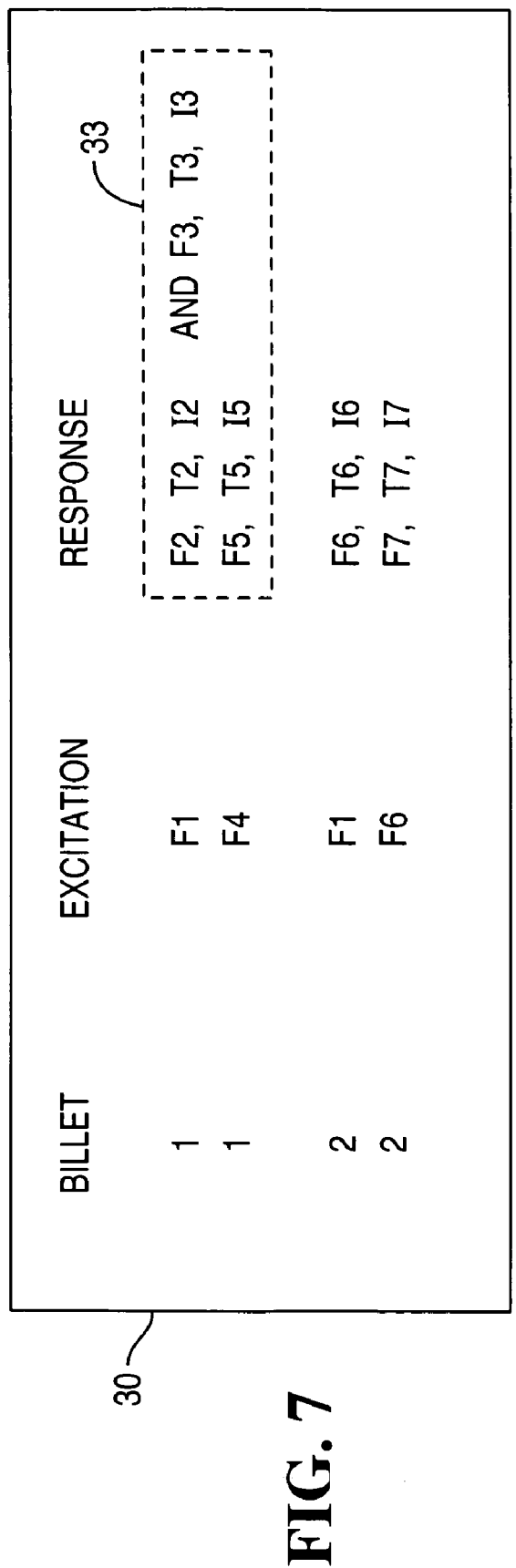
FIG. 7 illustrates part of a database for storing glass billet excitation and response information.

The principles just described can be used to construct a database 30 as shown in FIG. 7. The column labeled BILLET refers to a specific billet, which contains a specific set of relative percentages of components, and which was subjected to specific processing. Processing refers to the time-temperature history of the billet in melting and fusing the oxides and the rare earth element(s) together, and includes any heat treatment, such as annealing.

The column labeled EXCITATION refers to the frequency of excitation applied to the billet, or portion of the billet. In the case of BILLET 1, two excitation frequencies F1 and F4 are indicated.

The column labeled RESPONSE refers to the frequency, decay time, and initial intensity of signals emitted in response to the excitation frequency. For example, in the case of BILLET 1, the excitation frequency F1 produces emitted light of frequency F2, initial intensity I2, and decay time T2, and also emitted light of frequency F3, initial intensity I3, and decay time T3.

In addition, excitation frequency F4 produces emitted light from BILLET 1 of frequency F5, initial intensity I5, and decay time T5.

Of course, the specific definitions of intensities, such as I5, and decay time, such as T5, are here chosen for convenience. Other definitions are possible, and values other than initial intensity and 50-percent-decay-time can be used.

Also, if a delay time, such as DEL-T in FIG. 5, is found significant for a particular billet and excitation frequency, that delay time can also be included in the database, among other information.

As previously discussed, a PL signature refers to aspects of PL emission from a security marker or group of security markers that are unique to that marker or group of markers. As such, a PL signature can be defined as the response of a billet, or part thereof, to excitation at one or more excitation frequencies, such as presence or absence of one or more emitted frequencies, and/or one or more individual properties of the emitted frequencies such as absolute or relative intensity and decay time. Such a PL signature can be used to, for instance, identify the billet, or part thereof.

In one example, a PL signature is derived using normalized PL emission from glass particles. In this example, the glass particles are illuminated (excited) and the resulting PL emission spectra comprising emission intensity at one or more emission frequencies is measured. To normalize the measured PL emission spectra, the measured emission intensity at a predetermined frequency is used as a reference by which the intensity at all other frequencies of interest in the PL emission spectra will be scaled. In other words, the measured intensity of those frequencies of interest in the PL emission spectra, which may be all of the frequencies measured, or a sub-set thereof, will be scaled relative to the measured intensity at the predetermined frequency.

Subsequently, the scaled emission intensity at each frequency of interest is translated into a data block comprising a predetermined number of bits. As an example, if there are eight frequencies of interest, then eight data blocks are produced, each having a predetermined number of bits. Translation of the scaled intensities may use digitization error correction, such as parity bits, to take account of boundary problems. This ensures that a given intensity will consistently translate to the same data block value even if the intensity varies by a relatively small amount (such as five per cent) when measured at different times, and/or under different conditions and such like.

The individual data blocks are then concatenated to produce a continuous sequence of data blocks for further use. This continuous sequence of data blocks can, for example, be used by itself as a PL signature for the illuminated glass particles, or it can be used to form part of a more complex PL signature for the glass particles.

If a more complex PL signature is desired, the decay of PL emission versus time may also be used to derive a PL signature. The decay of PL emission versus time may be obtained by, for example, measuring multiple PL emission spectra, each at a different time after de-activation of an illumination source, but before the PL emission from the glass particles has decayed completely.

Deriving a single PL signature from multiple PL emission spectra may be achieved by concatenating the individual PL signatures derived for each of the measured PL emission spectra as described in the example above. Likewise, the individual data blocks for each measured PL emission spectra may be concatenated to form a single PL signature from the multiple PL spectra. Thus, if three PL emission spectra are measured, each having eight frequencies of interest, then a PL signature resulting from concatenation of the data blocks from the three comprises twenty-four data blocks. To counterfeit this PL signature it would be necessary to provide a material that had, not only a PL emission having the same initial intensity ratios at the frequencies of interest, but also having the same intensity decay characteristics at each of the frequencies of interest.

Representing a PL signature as a sequence of bits allows a measured PL signature to be matched with one or more pre-stored PL signatures very quickly and easily using digital comparing techniques, for example, an exclusive nor (XNOR) Boolean function. Once matched, the PL signature can be validated, and/or additional information associated with the matched PL signature can be retrieved from a storage and presented to a user, and the like.

In other examples, additional methods of generating and representing a PL signature, such as representing the PL signature as a stored table of relative or absolute emission intensities and decay times at one or more frequencies of interest resulting from various excitation frequencies, and such like, may be used.

For example, a PL signature of BILLET 1 in FIG. 7 can be defined as the response of BILLET 1 to excitation frequencies F1 and F4 as shown in the dashed box 33 of FIG. 7. Subsequently, a security marker can be identified as being derived from BILLET 1 if the response of the security marker to excitation frequencies F1 and F4 comprises the PL signature of BILLET 1, namely the response shown in the dashed box 33.

Of course, a PL signature of BILLET 1 can also be defined by a sub-set of the contents of the dashed box 33, such as only intensity I2 and decay time T2 of response frequency F2. Likewise, a PL signature of BILLET 1 may include only response information relating to excitation frequency F1. In such case, response information relating to excitation frequency F4 could be eliminated and/or otherwise ignored in defining the PL signature of BILLET 1, and in any subsequent attempt to identify BILLET 1 or part thereof. In a similar fashion, response information relating to background excitation sources can be eliminated and/or excluded from the PL signature of a billet.

It is also possible that a single billet may have more than one PL signature. For example, referring to FIG. 7, a first PL signature of BILLET 2 may be defined as the response of BILLET 2 to excitation frequency F1, namely F6, T6, and I6. Likewise, a second PL signature of BILLET 2 may be defined as the response of BILLET 2 to excitation frequency F6, namely F7, T7 and I7. Either or both of the first and second PL signatures of BILLET 2 may then be used to, for instance, identify a security marker comprising BILLET 2 or any part thereof, such as the pulverized glass powder or dice (etc.) of FIG. 1. Having more than one PL signature for a BILLET is particularly advantageous because if a counterfeiter somehow managed to create a material that replicated the first PL signature of the BILLET, secure identification or validation of the BILLET (or a portion of the BILLET) could still be performed using the second PL signature. For example, a first PL signature is defined as a response of BILLET 2 to excitation at a first excitation frequency F1. A second PL signature may be defined as a response of BILLET 2 to excitation at a second, different excitation frequency F6. In such case, it is highly unlikely that a counterfeit material that replicates the first PL signature at the first excitation frequency F1 will also replicate the second PL signature at the second, different excitation frequency F6.

Several significant features which distinguish the pulverized glass/dice 3 (etc.) of FIG. 1 from prior art security markers or taggants are the following.

One is that it is difficult to reverse-engineer the dice. That is, it is difficult for one to excite the glass as indicated in FIG. 2, detect the PL signature, and then fabricate a glass which produces that PL signature. One reason is that a complete database of the type shown in FIG. 7 is not known to exist. That is, a complete database which covers all possible compositions and processing steps of glass billets, and their PL signatures, is not known to be available in the literature.

Figure 8:
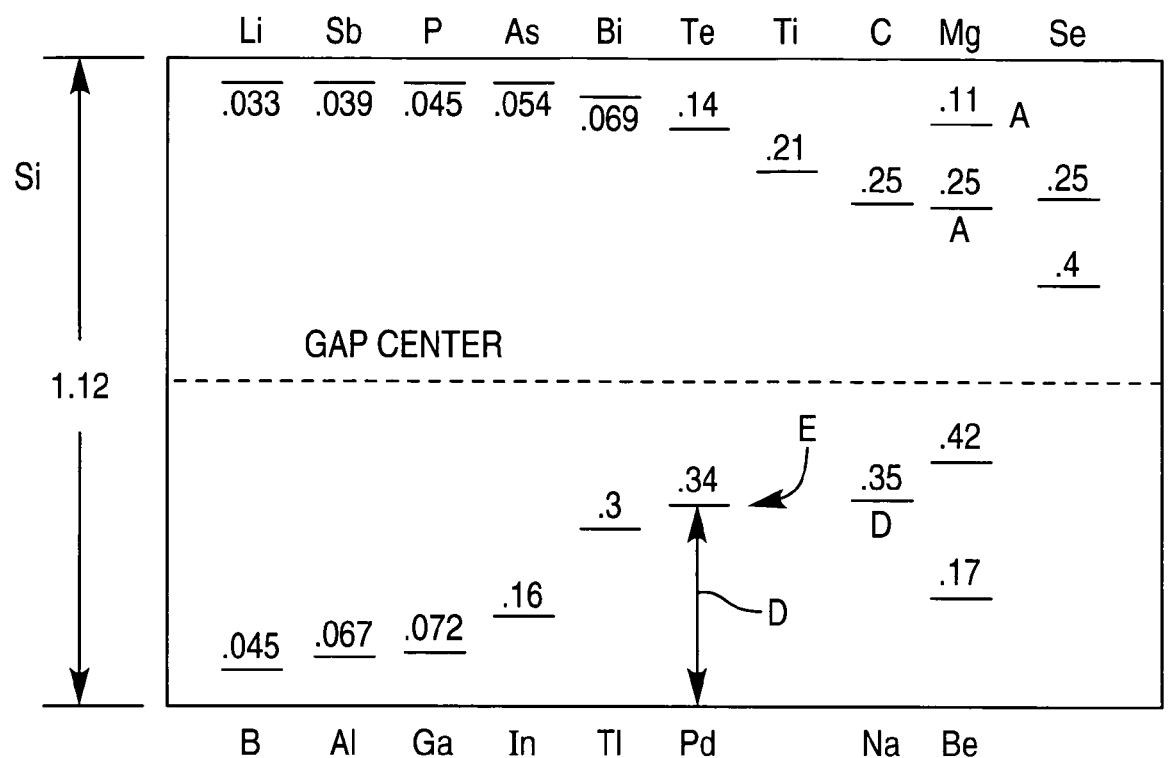
FIG. 8 illustrates a prior-art table of energy levels of various dopants in silicon.

This fact distinguishes the invention from systems which may appear to be similar, but are not. For example, silicon, a crystal, can be doped with different elements. The doped silicon can then be excited, and radiated light of frequency corresponding to the doping element will be detected. Based on the frequency of the emitted light, one can consult known tables, and determine the identity of the dopant. FIG. 8 illustrates such a table. The frequency of emitted light will depend on the drop in energy D experienced by an electron, and that drop will depend on the energy level E created by the dopant. One can thus reproduce the silicon-dopant system, based on the table.

However, to repeat, such tables are not known to exist for the glass taggants of the present invention.

A second feature is that the glass taggants of the present invention are not crystalline. Glasses, in general, are amorphous solids, they are not crystals. Thus, an energy level system corresponding to that of FIG. 8 is not present or, if present, is different for the different glasses described herein.

A third feature is that some glasses are classified as refractory materials. Dice, or powders, of such glasses can withstand high temperatures. Such glasses are unaffected by temperatures of 400, 500, 700, 1000 degrees F., and higher. This distinguishes them from most, if not all, fluorescent inks and paints, and the surfaces to which the inks and paints are applied.

Several applications of the glasses under consideration will now be discussed.

Figure 9:
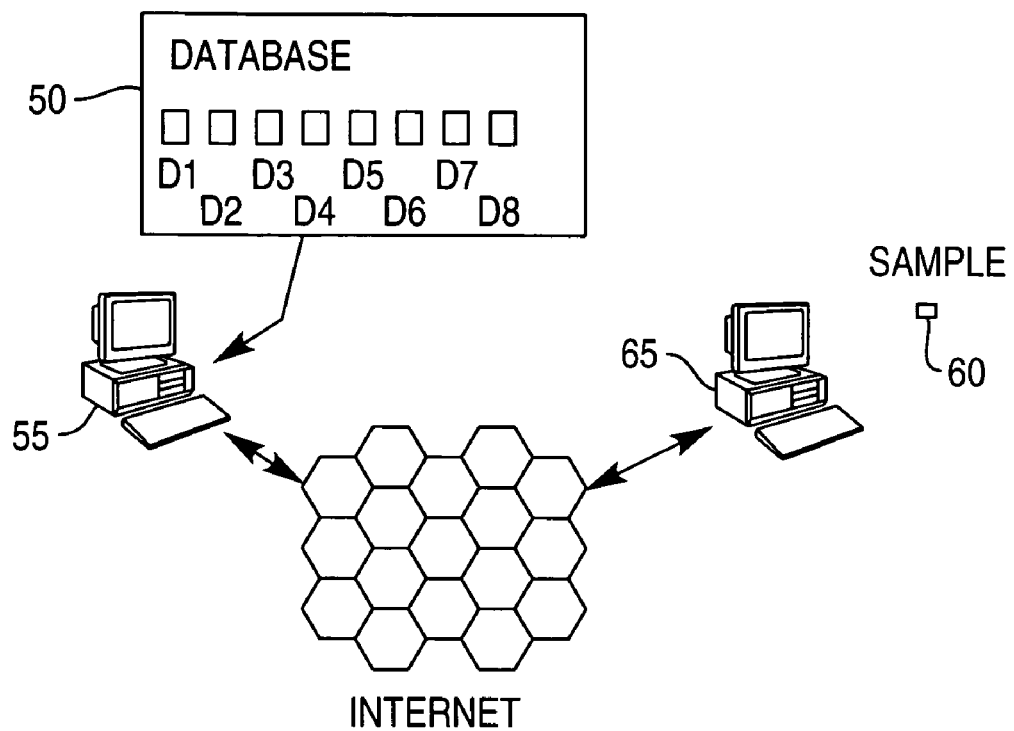
FIG. 9 illustrates a computer storing a database comprising glass billet information which is accessible by a remote computer.

In FIG. 9, a database 50 is stored in a computer 55. The database 50 is, for example, generated by a glass foundry (not shown) which fabricated a billet 2 in FIG. 1 of glass. The glass foundry subjected the billet, or fragments of it, to various excitation frequencies, and measured the PL signature of the glass. Data concerning the glass, such as the composition, processing steps including heat treatment such as annealing, excitation frequencies and resulting PL signatures, are stored in the database 50, and indicated by blocks D1-D8. The identity of the foundry can also be included in the data.

The glass foundry can repeat the process for another billet of glass, of different composition and/or process steps.

Subsequently, a user (not shown) would excite a sample 60 of the glass billet to determine a PL signature. For example, the sample may be attached to a specific article (not shown). The user would apply excitation frequencies to the sample 60, and obtain a PL signature of the sample 60. FIG. 2 illustrates generalized excitation frequencies in image 10, and the PL signature which results.

The PL signature obtained can be represented as a collection of data. The data may be raw intensity versus wavelength and/or time data, a processed version of this raw data, a subset of this raw data, or such like. The user then transmits this collection of data to the computer 55 in FIG. 9, over the INTERNET, using the user's own computer 65. Through use of database 50, knowledge of the PL signature allows one to ascertain the billet of glass from which the sample 60 in FIG. 9 originated, or any additional data associated with the billet in the database, such as the identity of the foundry which fabricated the glass.

In addition, other information can be included in the database 50 in FIG. 9. For example, a billet having a given PL signature can be transferred to a specific party, such as a government. That party can be identified in the database 50, in connection with the data regarding the billet.

As a more specific example, fragments of the billet can be pulverized and added to an ink which is used to print currency. If a sample 60 of the glass billet in the currency is excited, and the resultant PL signature points to the specific billet, then it is known that the currency is associated with the billet delivered to the particular government.

Thus, in general, a sample 60 in FIG. 9 of a billet can be used to trace the origin of the sample. Or database 50 in FIG. 9 can indicate the original owner of the billet from which the sample 60 is derived.

Figure 10:
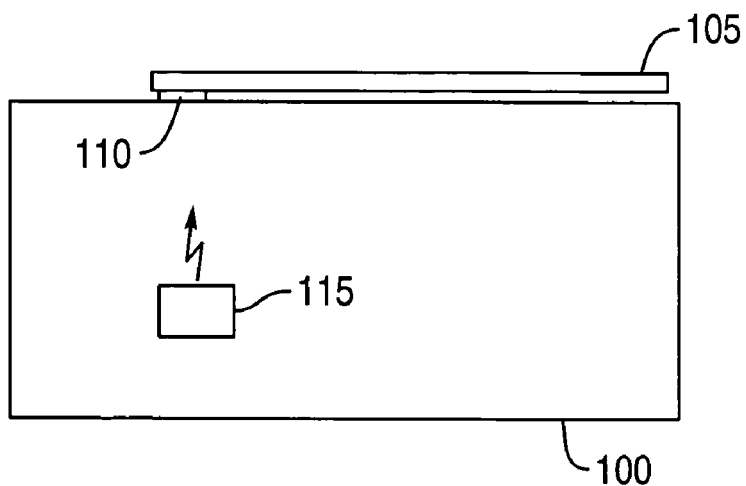
FIG. 10 illustrates one form of the invention, implemented in connection with a photocopier.

In another application, the glass can be used to suppress counterfeiting or copying. Block 100 in FIG. 10 represents a photocopier. Block 105 represents a sheet to be copied, which can take the form of a visual image on a paper carrier. Block 110 represents a fragment of the glass attached to the paper carrier.

Block 115 represents a detector, which illuminates the sheet 105 at the copying station, and thereby illuminates block 110, the fragment of glass. If block 110 produces a particular PL signature, then the detector 115 blocks copying, so that the photocopier 100 will not copy the sheet 105.

Alternately, the system could be designed so that only sheets bearing an authorizing block 110 can be copied. Thus, if the proper PL signature is detected, copying is allowed, and ordinary sheets lacking a block 110 cannot be copied. Alternatively, or additionally, if the authorizing block 110 has a first PL signature then the sheet can be copied for a first fee; if the authorizing block 110 has a second PL signature (instead of—and different from—the first PL signature), the sheet can be copied for a second fee (higher than the first fee); whereas, if the authorizing block 110 has a third PL signature (instead of—and different from—the first or second PL signatures) then the sheet cannot be copied. This provides a hierarchy of permissions for photocopying, with associated fees where photocopying is permissible, and may be linked directly or indirectly to a copyright licensing organization for automatically reporting and/or collecting licensing fees. Other applications that are similar to this will be evident to one of skill in the art. For example, instead of a photocopier machine, a multi-media copier (such as a DVD copier or burner, or a CD copier or burner) may have a reader installed to permit copying of media items (DVDs, CDs, and such like) based on a PL signature of a fragment of glass incorporated in the item to be copied.

Figure 11:
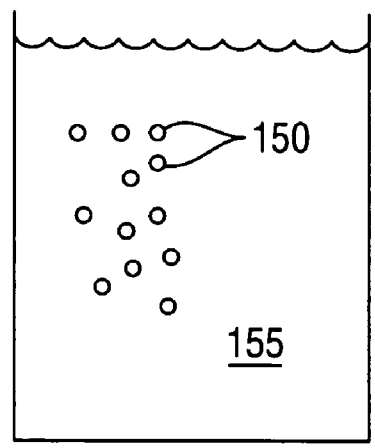
FIG. 11 illustrates a liquid carrier in which is suspended glass particles of the type described herein.

In another application, fragments 150 of the glass in FIG. 11 are added to a liquid carrier 155, such as a varnish, ink, lacquer, paint, adhesive, or such like. In one embodiment, the fragments take the form of a fine powder, and have no dimension larger than, for example, one micron, five microns, ten microns, fifteen microns, or twenty microns. In one embodiment the powder is sufficiently fine that the granules are invisible to the naked eye. In another embodiment, the grains of the powder are approximately the size of the grains of common table salt. In a convenient embodiment, each grain is in the form of an approximately five micron diameter generally spherical bead.

Figure 12:
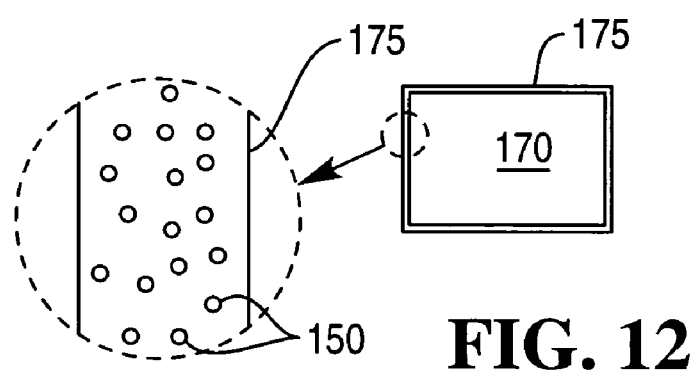
FIG. 12 illustrates a coating on an article, which coating contains glass particles.

The liquid carrier comprises a paint which is painted onto an article 170 in FIG. 12, forming a coating 175. The PL signature of the particles can be detected in the manner described above, and the database 50 in FIG. 9 can then be used to deduce information about the article 170 based on the detected PL signature. The article 170 may be a complex product (having many separate parts), where each part is painted using the paint including the fragments 150. This ensures that the entire product has the same PL signature, even though the product is a composite of many parts, as will now be described with reference to FIG. 12a.

Figure 12A:
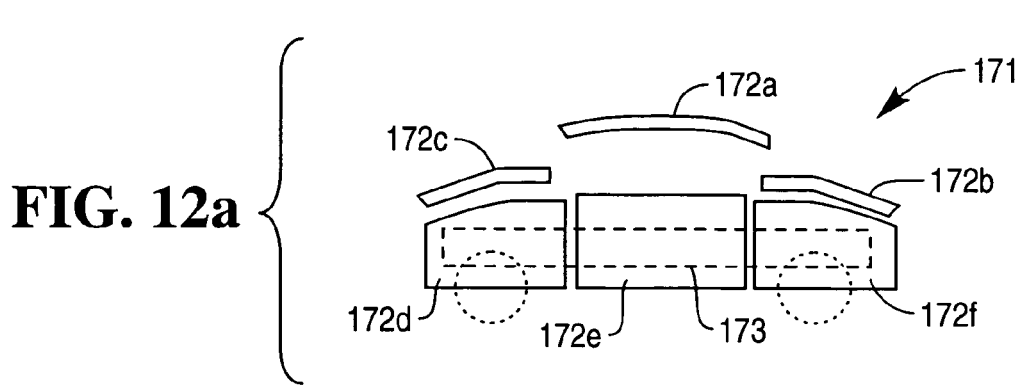
FIG. 12a illustrates a complex product in the form of an automobile including a coating containing glass particles.

FIG. 12a shows in simplified block diagram form an automobile 171 having six painted panels 172a to 172f and a chassis 173. The panels 172 and the chassis 173 have the same PL signature because they are covered by paint including the fragments 150. For clarity, the automobile 172 is shown having only six panels; however, an automobile may have many more panels than six. If parts from another automobile are used to replace the original panels 172 or chassis 173 (for example, because of damage caused by a road traffic accident) then the new parts will have a different PL signature. This allows potential buyers to ascertain whether the automobile has been repaired by measuring the PL signature from various parts of the automobile 171.

It will now be appreciated that this provides a powerful tool which enables a buyer, or a person evaluating a complex product, to identify any products that have been formed by combining two or more different products. Those skilled in the art will now appreciate that the complex product may be any of a variety of products, such as airplanes, automated teller machines (ATMs), and such like.

Where complex products include a large number of parts that are replaced to maintain the product in working order, or to upgrade the functionality of the product, then authorized replacement parts may include a unique PL signature that is automatically scanned by a reader in the complex product when they are installed. If the replacement parts do not have the authorized PL signature then the product may not communicate information to, or may not allow operation of, the unauthorized part. This example has value in products such as ATMs which have many different modules that inter-communicate and that receive and transmit sensitive information.

Figure 12B:
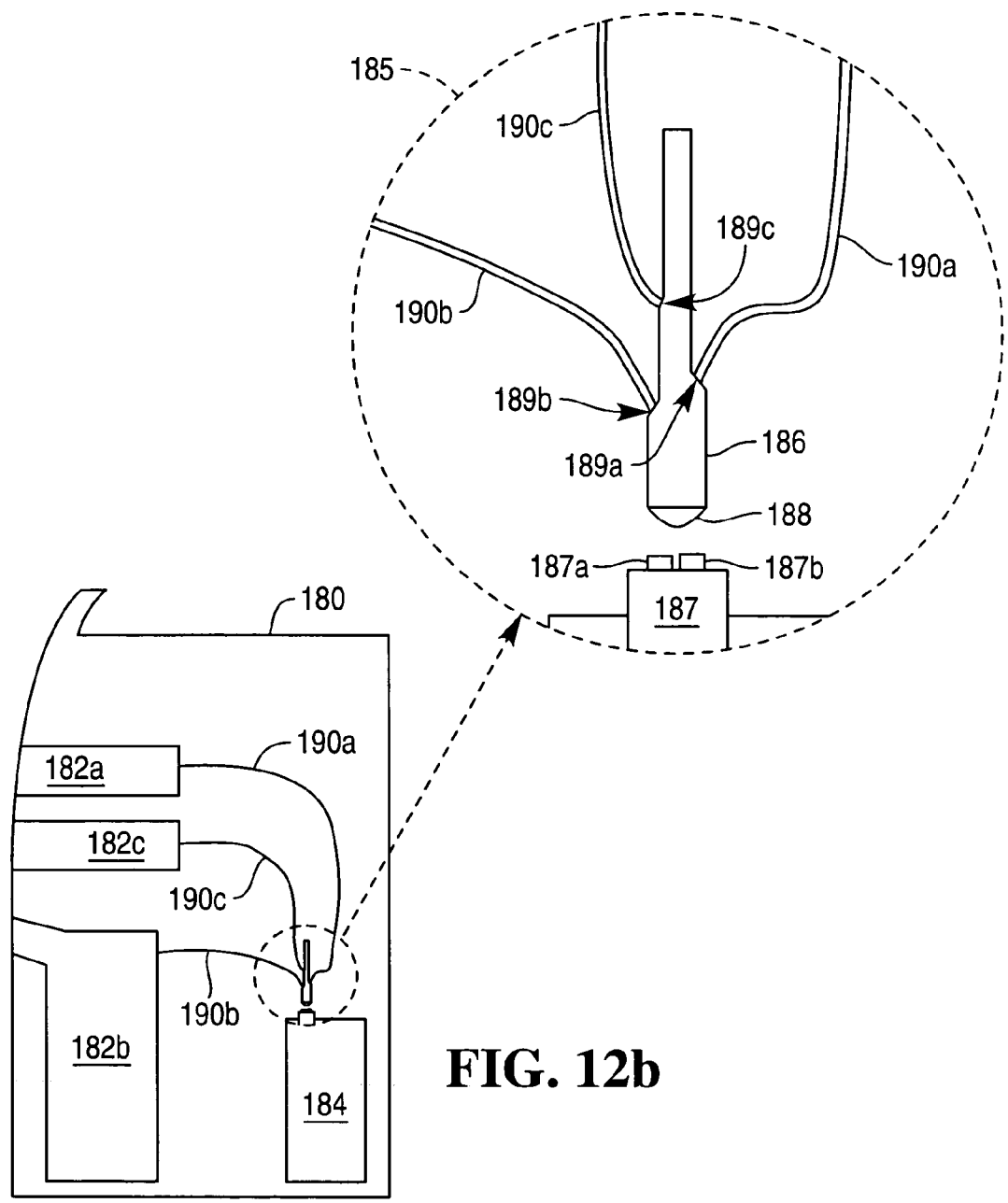
FIG. 12b illustrates a complex product in the form of an ATM comprising an improved module security system.

FIG. 12b illustrates an ATM 180 embodying an improved module security system. The ATM 180 has a plurality of modules 182, including a card reader module 182a, a cash dispenser module 182b, and a receipt printer module 182c. The ATM 180 also has an ATM controller 184 that controls the operation of the ATM 180 and the modules 182 therein.

The ATM controller 184 includes a light guide arrangement 185 that provides an optical link between the ATM controller 184 and each module 182. The optical light guide arrangement 185 includes an optical coupler 186 mounted to the ATM controller 184 in the vicinity of detector 187. The detector 187 includes an illumination source 187a and a sensor 187b.

The optical coupler 186 includes a lens portion 188 for focusing (i) light from the illumination source 187a into the optical coupler 186, and (ii) light from the optical coupler 186 into the sensor 187b. The optical coupler 186 also includes an entry/exit port 189 for each module 182 in the ATM 180 that is to be secured. A dedicated light pipe 190 for each module conveys light between the module and its respective entry/exit port 189. Thus, the ATM controller 184 is coupled to the card reader module 182a by a card reader light pipe 190a extending from the card reader module 182a to the card reader entry/exit port 189a in the optical coupler 186. Similarly, a light pipe 190b couples the cash dispenser module 182b to the cash dispenser entry/exit port 189b; and a light pipe 190c couples the receipt printer module 182c to the receipt printer entry/exit port 189c.

Each light pipe 190 is coupled to a respective module 182 at an area on the module that includes glass fragments having a PL signature associated with that module. For example, the card reader module 182a may have a first PL signature, the cash dispenser module 182b may have a second PL signature (different from the first PL signature), and the receipt printer module 182c may have a third PL signature (different from the first PL signature and also different from the second PL signature).

When a module 182 is replaced in the ATM 180, the ATM controller 180 illuminates the new module 182 via the optical coupler 186 and light pipe 190 for that module, and detects the PL signature from that module. If the PL signature does not match the PL signature expected for that module then the ATM controller 180 may not communicate with that module, or may only provide minimal communications to that module, thereby disabling some or all operations of that module.

Significantly, in some cases, an article can perform a function, and the presence or absence of glass particles does not interfere with that function, such that the function can be performed whether or not the particles are present. For instance, if the article is a handgun, the presence or absence of glass particles in, for example, paint applied to the handgun, does not interfere with the function of the handgun, and the particles need not be present for that function to exist. However, in some examples, the particles may be used to permit or deny access to a function performed by the article, as in the case of a key to secure a physical or electronic space.

As shown in FIG. 20, a physical space 600, such as, for example, a room in a prison or in a nuclear weapons facility, may be secured by a door 602 having a lock 604 controlled by a reader 606 that only allows entry to a person 608 presenting an item 610 incorporating the correct particles.

The reader 606 comprises: an excitation source 612 in the form of a pair of LEDs to stimulate PL emission from the particles; a detector 614 in the form of an array of photodiodes to measure PL emission from the particles; a store 616 in the form of an EPROM for storing one or more pre-defined access profiles; and a processor 618. To access the room 600, a person 608 presents the item 610 to the reader 606. The item may be clothing (for example a shirt or gloves), a token (such as an identification card), and such like. Upon presentation, the reader 606 pulses the LEDs 612 to illuminate the item 610 at one or more excitation wavelengths, and detects PL emission from the item 610 in response to the excitation using the detector 614. The processor 618 processes the detected PL emission to generate an access signature. The processor 618 then compares the access signature with the predefined access profiles stored in the EPROM 616, and if the access signature matches one of the pre-defined access profiles, then the processor 618 sends a signal to open the lock 604 and allow access to the room 600.

In one embodiment, processing the detected emission to generate an access signature may comprise identifying one or more peak emission wavelengths from the detected emission. Likewise, comparing the access signature to one or more pre-defined access profiles may comprise comparing the identified peak emission wavelengths to respective peak emission wavelengths of the one or more pre-defined access profiles to determine if a match is found.

In another embodiment, processing the detected emission to generate an access signature may comprise calculating one or more ratios of intensity at one or more peak emission wavelengths found for the detected emission. Comparing the access signature to one or more pre-defined access profiles may, then, comprise comparing the calculated ratios of intensity to respective ratios of intensity for the one or more pre-defined access profiles to determine if a match is found.

In another embodiment, instead of the space being physical, it may be electronic, such as a store on a personal computer, PDA, self-service terminal, server and the like. One such example is shown in FIG. 21. In FIG. 21 a personal computer 650 is shown having a processor 652 electrically connected to RAM 654, and a hard disk 656 comprising a plurality of logical stores 658, shown as 658-1, 658-2, . . . , 658-n. Access to the logical stores 658 is controlled by an electronic gatekeeper 660 residing in RAM 654 and executed by the processor 652. A user 662 of the computer 650 desiring access to one or more of the logical stores 658 must present an item 664 such as a token or clothing incorporating one or more security markers 666 to a reader 668 comprising a light source 670 and a detector 672. The reader 668 is electrically coupled to the computer 650 by, for example, a USB connection 674.

In use, the processor 652 sends a signal to the light source 670 in the reader 668 to illuminate the item 664, and receives a signal from the detector 672 using USB connection 674. The received signal comprises detected emission from the one or more security markers 666 incorporated in the item 664 resulting from the illumination. The detected emission is then processed by the processor 652, and the resulting processed emission is compared to one or more access profiles 676 in RAM 654. Access profiles 676 define access rights to one ore more of the logical stores 658. If a match is found between the processed emission and one of the one or more access profiles 676, access to one or more logical stores 658 is provided to the user 662 by the electronic gatekeeper 660 according to the respective access rights.

In an alternate embodiment, the reader 668 additionally includes a reader processor (not shown) for processing the detected emission, comparing the processed emission to one or more access profiles 676 in a reader store (not shown), determining if a match exists, and sending a signal to the electronic gatekeeper 660 via USB connection 674 to authorize access to one or more of the logical stores 658 by the user 662 according to the matched access profile. In all cases, one or more matches may be found providing access to one or more of the logical stores 658. In addition, in a further embodiment, the reader 668 may be incorporated within the personal computer 650.

A token to gain access to a secure area may take the form of a glass rod having security markers incorporated in it. The rod may have rings of different security markers, such that each ring has a unique security marker, the rings being spaced along the length of the rod. To gain access, the rod is lowered into a reader to a depth at which one or more rings can be read. Access is provided if the correct marker rings are read such that the correct PL signature is provided.

Further, an article may only perform a function in response to reading a predetermined PL signature. For example, a handgun may include a reader in a grip of the gun configured so that the gun will only fire a bullet when a user presents to the reader particles having the correct signature. One such arrangement is shown in FIG. 22.

In FIG. 22, a gun 700 includes a reader 702 in the grip 704 of the gun 700. The reader 702 comprises a light source 706, a detector 708, a memory 710 and a solenoid 712, all of which are electrically coupled to a controller 714 for controlling operation of the reader 702. Solenoid 712 includes an inductive coil 716 surrounding a movable shaft 718. The solenoid 712 is located such that a hammer 720 of the gun 700 will not move, and the gun 700 will not fire, when the movable shaft 718 is in a first, extended position, and the hammer 720 will move, and the gun 700 will fire, when the shaft 718 is in a second, retracted position.

In operation, a user (not shown) presents particles 722 to the reader 702 via a glove 724 which incorporates the particles 722. Upon command from the controller 714, the light source 706 illuminates the glove 724, and the detector 708 detects resulting emission from the particles 722 in the glove 724. The controller 714 then processes the detected emission and compares the processed emission to one or more operation profiles in the memory 710. If a match is found, the controller 714 sends a signal to the inductive coil 716 of the solenoid 712 to retract the shaft 718, allowing firing of the gun 700. If no match is found, the controller 714 sends a signal to the inductive coil 716 of the solenoid 714 to extend the shaft, disabling firing of the gun 700.

In other embodiments, the solenoid can be designed to normally extend the shaft 718, disabling firing of the gun 700, until a retract signal is received from the controller 714. Further, in addition to the glove 724, a user may present the particles 722 to the reader 702 in a variety of alternative ways including holding the grip with a finger on which there is a ring including the particles 722, or holding the grip with a finger having a tattoo including ink incorporating the particles 722, and the like.

An extension of this is that a gun may not fire if a reader associated with the gun is pointed at a target that includes a security marker having a predetermined signature. This may be used to reduce so-called "friendly fire" by, for example, incorporating the particles into the uniform of a friendly soldier. It may also be used to ensure that weapons falling into the hands of an enemy cannot be used by the enemy against the army who manufactured the weapon.

Although the example of a gun has been given, it will be appreciated that performance or activation of a function of other articles could be controlled by such particles, for example, automobiles, industrial machinery, power tools, boats, airplanes, electronics, computers, self-service terminals including ATMs, and such like. Further, where multiple functions are provided by an article, performance of one or more of the multiple functions may be controlled by these particles.

In some applications, multiple people may each have to provide a token to enable an item to operate. For example, to launch a missile (such as a nuclear weapon), two or more people may each have to provide a token, and each token may have a different PL signature.

In another application, it is not necessary to consult a database. A detector, as described herein, can be equipped with data which indicates a PL signature of fragments from a glass billet. Or the data can indicate multiple PL signatures, for multiple billets.

Figure 13:
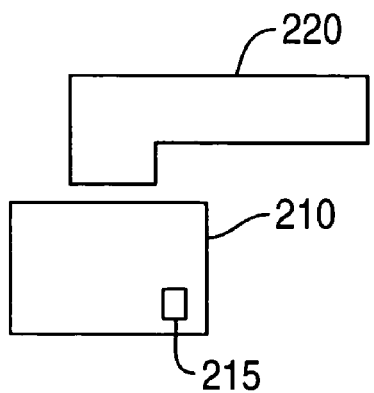
FIG. 13 illustrates a carrier supporting a glass particle.

In use, an article 210 in FIG. 13, which carries a glass fragment 215, is submitted to a detector 220. The detector 220 obtains the signature of the fragment 215 and, if the signature matches a stored signature, the detector thereby deduces information about the article 210. Such information can relate to authenticity, origin, ownership (including chain of custody), information about the article 210, or any other characteristic which possession of a fragment 215 having a predetermined signature can represent.

For example, the article 210 can take the form of a document (such as a passport, visa, customs sheet, will, stock certificate, certificate of authenticity, boarding pass, receipt, invoice, prescription, a standard form, an operator's license, driver's license, or such like), an item of fine art, a label, a registration plate or card for a vehicle or other item commonly registered with a government, a written signature or fingerprint carried on a card, or a storage medium such as a CD, DVD, or floppy disc. If the fragment 215 emits a specific PL signature, then that signature indicates that the article 210 may be copied, or is prohibited from being copied, as appropriate. The articles can also take the form of a credit card, debit card, charge card, loyalty card, telephone card, stored value card, or casino chip. If the article is a form, it may include a URL, or some other link, encoded using the fragments, to allow a user to ascertain the source of the form or a location to obtain new forms from.

Where the article is valuable merchandise, such as china or pottery, the manufacturer may mark "seconds" (that is, merchandise that has failed a quality inspection and is sold at a reduced price) or reconditioned articles, with glass fragments emitting a specific PL signature upon excitation so that the "seconds" (or reconditioned items) cannot be sold as perfect merchandise.

In another example, a person may have a personal pen charged with ink including glass fragments having a PL signature unique to that person. This pen allows the person's written signature to be validated, not only by comparing a written signature claimed to be written by the person with the person's normal written signature, but also by ascertaining whether the ink used includes glass fragments emitting the person's unique PL signature upon excitation. The person may have personalized writing paper (such as letter-headed paper) that indicates what the unique PL signature is (for example, it may include an image of the spectrum corresponding to the PL signature; or a type-written description of the PL signature, such as peaks at 500 nm, 515 nm, and 530 nm). This would allow a recipient to verify the claimed written signature by comparing the PL signature read from the ink used in the written signature with the PL signature described on the personalized writing paper.

If the article 210 is a label, it may be attached to another item. The label may be distributed throughout the item. For example, if the item is an article of clothing, the label may incorporated within the fabric of the clothing so that if the clothing is worn or washed, then the label will be removed, at least in part, from the clothing. This allows a merchant to determine if the clothing has been worn or washed. This may be advantageous for retailers who have a policy of not providing customers with refunds for clothing that has been worn or washed.

Security markers may also be used to store information, in a similar way to how a CD stores information, except that the security markers become the bumps for encoding, thereby providing secure media.

Likewise, security markers may be used in retail locations to reduce receipt fraud. Receipt fraud occurs, for example, when a person buys an item from a retailer, photocopies a receipt for that item, then goes back to the retailer, removes an identical item from the shelf, and "returns" the unpaid for item using the photocopied receipt. This fraud can be perpetrated against a large retailer many times using photocopies of a single receipt.

One example of how an embodiment of the present invention can overcome this fraud is to provide receipts to retailers that include a unique code for each store. For example, a large retailer may have stores in every major city in the U.S. However a Dayton, Ohio store has a different unique code to a Stowe, Vt. store owned by the same retailer. These codes are provided using security markers. In one example, the security markers are applied to the receipt via a clear adhesive that is printed on the master rolls of receipt paper together with other printing information (such as advertisements). This clear adhesive and the security markers are invisible to human eye, so they function as a covert security feature. The master rolls of receipt paper are then cut into individual rolls suitable for a point of sale station, and securely distributed to the appropriate store for that code.

In another example, the security markers are applied at the point of delivery to the customer (that is, at the checkout station), either by printing, pressure, or other convenient mechanism.

Figure 23:
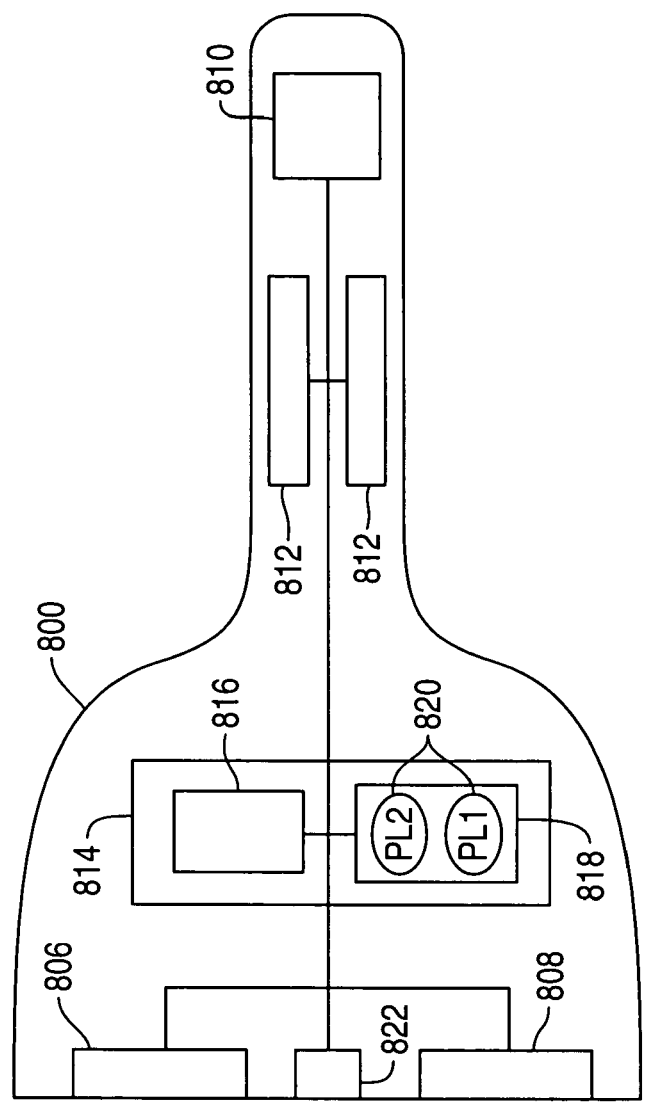
FIG. 23 illustrates a system for reducing receipt fraud.

One example of a system for preventing receipt fraud is shown in FIG. 23. The system of FIG. 23 includes a wireless reader 800, and a receipt 802 incorporating one or more security markers 804. The wireless reader 800 includes a light source 806 for illuminating the receipt 802 and exciting the security markers 804, a detector 808 for detecting resultant emission from the security markers 804 in response to the excitation, a wireless communication module 810 for communicating with a server such as a point-of-service terminal (not shown), one or more batteries 812 for providing power to the various components of the wireless reader 800, and a controller 814 for controlling operation of the wireless reader 800. The controller 814 comprises a processor 816 and a memory 818 storing one or more valid PL signatures 820. The wireless reader 800 further includes a proximity sensor 822 for sensing proximity of an object such as the receipt 802, and thereby causing the reader 800 to attempt to read the security markers incorporated into the receipt 802.

Upon presentation of the receipt 802 to the reader 800, the proximity sensor 822 signals the controller 814 to initiate a read operation. The controller 814 then sends a signal to the light source 806 to illuminate the receipt 802 to excite the security markers 804. The detector 808 then detects emission from the security markers 804 resulting from the illumination, and sends the detected emission to the controller 814, where it is processed by the processor 816 to ascertain a PL signature of the detected emission. The processor 816 then compares the ascertained PL signature of the detected emission to the one or more valid PL signatures 820 in the memory 818 to determine if a match is found. If a match is found, the receipt 802 is found to be valid and an item whose purchase is indicated by the receipt 802 may be returned. If no match is found, the receipt 802 is found to be invalid, and no return may be made.

Valid PL signatures 820 are downloaded to the reader 800 on an on-demand, or scheduled, periodic basis from a server (not shown) using wireless communication module 810. Likewise, in other embodiments, processed or raw, detected emission data can be uploaded from the reader 800 to a server (not shown) using wireless communication module 810 for processing and/or comparison by the server against valid PL signatures stored in an on-line database accessible to the server. Further, in other embodiments, a user operable switch (not shown) can be used to activate the reader 800 in addition to, or rather than, the proximity sensor 822.

In the event there is no, or no matching PL signature then the receipt should be investigated as a potential photocopy, and may be part of a fraud. Further, if a valid PL signature is present, then it can be checked against the PL signature for the store that issued the receipt (which is printed on the receipt). If the two PL signatures do not match then the receipt may be a photocopy printed onto a stolen roll of receipt paper.

As another example, since differing billets of glass produce different PL signatures, those signatures, or the corresponding billets, can act as identification numbers. These ID-glasses can be attached to, or embedded in, articles to indicate ownership. This concept is applicable to articles such as items of fine art, precious metals and jewelry, human tissues such as organs, semen, and blood, and certificates.

As a specific example, an ID-glass can be inserted into a body fluid which is to be tested for illness, or presence of drugs or alcohol. The ID-glass, being inert to most common reagents, will not affect the test results, except perhaps by contaminating an optical test, which would be rare. The ID-glass identifies the owner of the fluid.

As another example, an ID-glass can identify origin of an article, and thus provide authentication. As a specific example, this can apply to items of fine art, liquors, perfumes, human tissues, admission tickets, and entertainment recordings such as video and audio tapes and discs.

As another example, the ID-number feature of the ID-glass can be used to classify articles or substances. As a specific example, ten different ID-glasses, with ten different PL signatures, can be fabricated. These can be used to distinguish ten ostensibly identical, yet different, articles. For example, while contact lenses may look identical, their inherent prescription may be different. A tiny ID-glass included on the edge can identify the contact lens. A similar principle applies to blood type, pharmaceuticals, chemicals, and so on.

Figure 24:
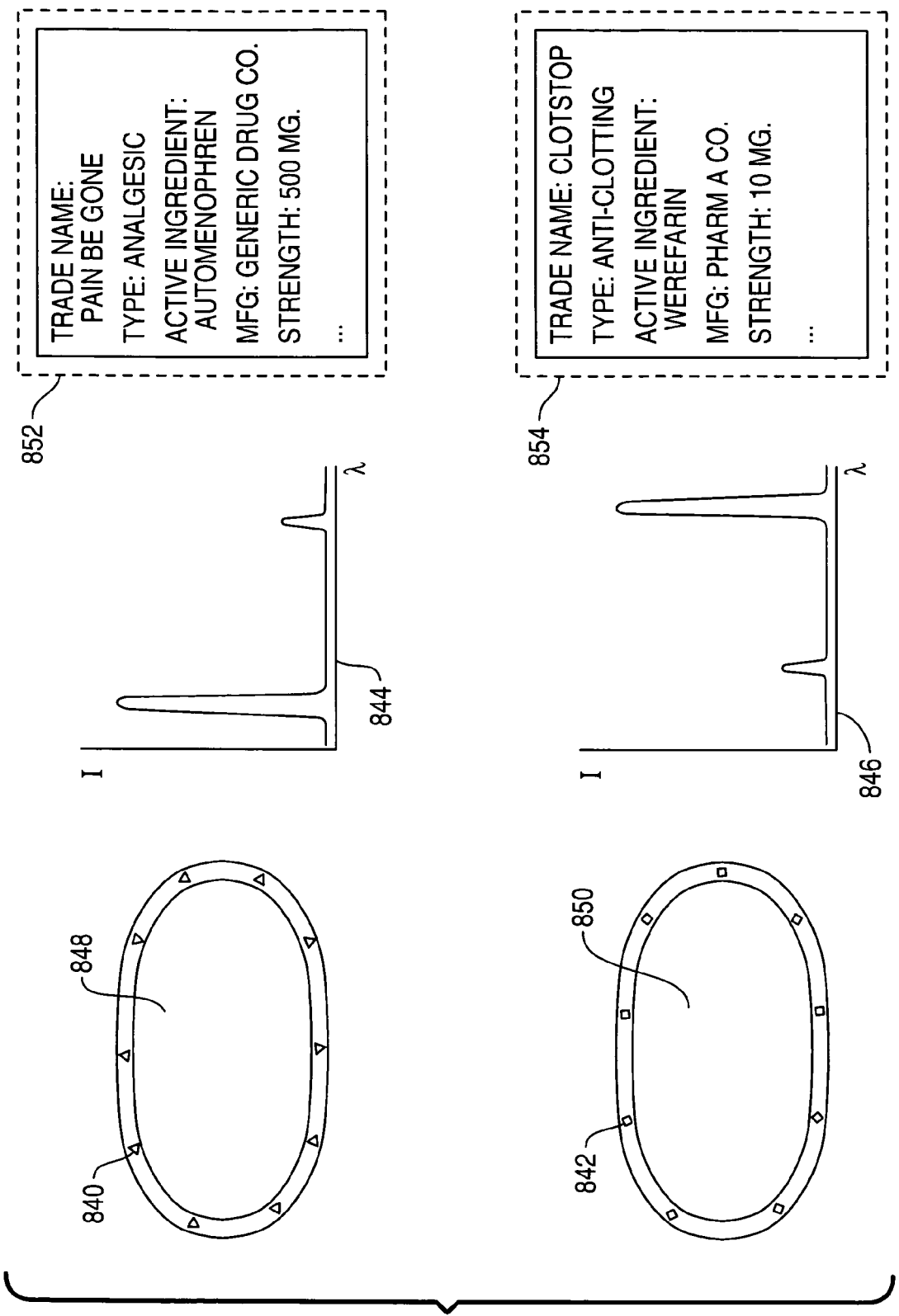
FIG. 24 illustrates two pharmaceuticals, each marked with a different type of glass particle, a luminescence spectrum from each of the different types of glass particles, and identifying information associated with each luminescence spectrum.

Pharmaceuticals can be distinguished by including a taggant with a unique PL signature on or in a medication. The taggant may comprise one or more fragments of a single type of rare earth doped glass, or one or more fragments of multiple types of rare earth doped glass. The taggant may be located on or in each individual medication or pill, and/on or in a package containing the medication or pill, and such like. For example, as shown in FIG. 24, one or more rare earth doped glass fragments 840 and 842 with unique PL signatures 844 and 846 may be incorporated in the outer coating of medications 848 and 850, respectively.

The PL signatures 844 and 846 may be associated with identifying information such as medication type, trade name, active ingredient, manufacturer, strength, dose, dose frequency, adverse interactions, and the like, which may be provided to a user through, for example, a screen 852 and 854 of a reader (not shown) adapted to ascertain the respective PL signatures and access and present the identifying information. Such use would make it simple to distinguish between, for example, an analgesic and a medication that reduces blood clots. Likewise, it would allow automated medicine dispensers to distinguish reliably between different types or strengths of medication. Similarly, such use could inhibit or prohibit dispensing two or more medications having potentially adverse interactions by providing appropriate indication of the same to a user or an automated dispense system.

Figure 25:
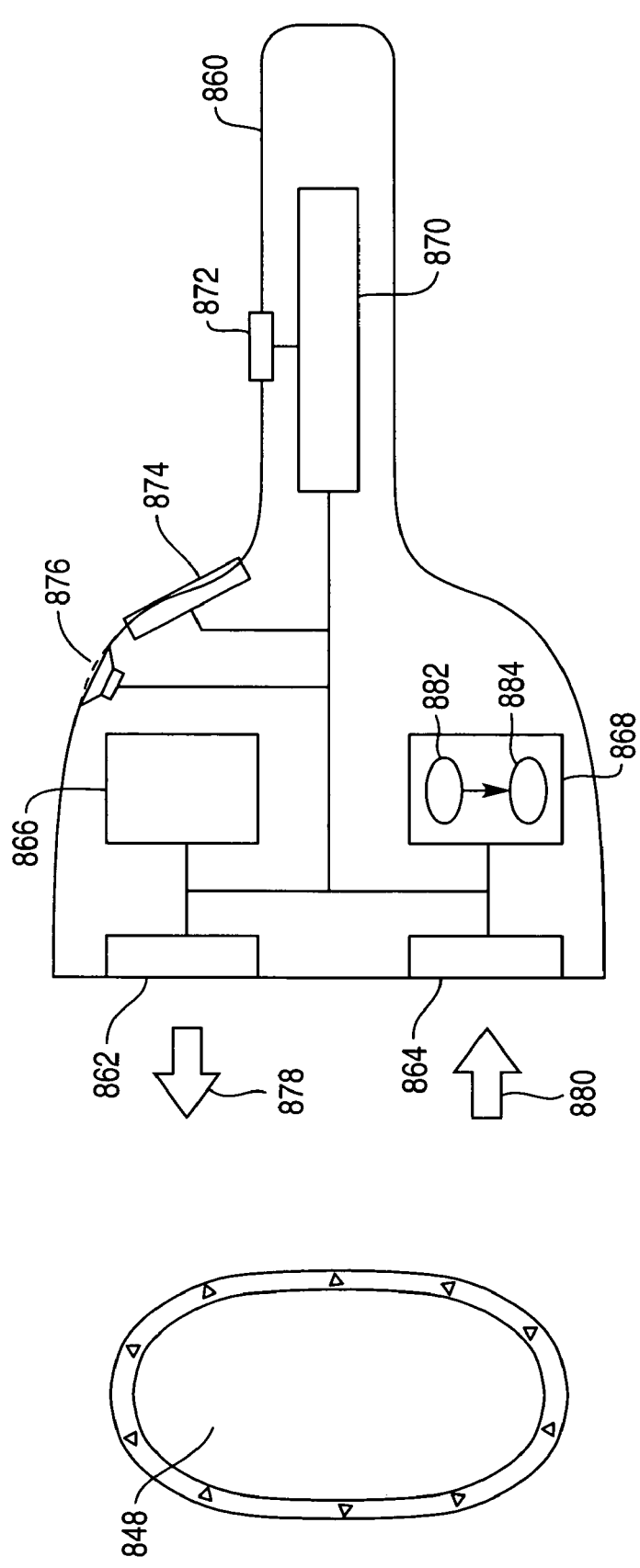
FIG. 25 illustrates a reader for use with the pharmaceuticals of FIG. 24.

As shown in FIG. 25, an appropriate reader 860 for pharmaceutical use may comprise an illumination source 862, a detector 864, a processor 866, a memory 868, a battery 870, a switch 872, a display 874 and a speaker 876. In use, the reader 860 is activated via the switch 872. After activation, the illumination source 862 illuminates a medication, such as medication 848, at one or more illumination wavelengths 878. Upon illumination and/or at some defined time thereafter, the detector 864 detects emission at one or more emission wavelengths 880. The illumination and emission wavelengths, 878 and 880, respectively, are associated with PL signatures of glass fragments for which the reader 860 is configured and/or programmed to read such as PL signatures 844 and 846 of FIG. 24. Subsequently, the processor 866 compares the detected emission with one or more emission profiles 882 stored in the memory 868. If a match is found, desired, associated identifying information 884 is retrieved from the memory 868 and provided to the user via the display 874. If no match is found, this result is also indicated on the display 874. The result of a match, as well as a non-match, may further be indicated via one or more audible tones through the use of the speaker 876. In one embodiment, a single, high pitch tone may be used to indicate a successful read, while a single, lower pitch tone may be used to indicate an unsuccessful read. Other combinations of number, frequency, and duration of tone may also be used.

In one embodiment, the reader 860 may be programmed or adapted to identify a single medication 848. In a further embodiment, the reader 860 may be programmed or adapted to identify a range of medications taken by a single individual or provided by, for example, a single or a range of manufacturers, and the like. Likewise, the reader 860 may also be programmed or adapted to indicate adverse interactions, and provide a warning to a user to avoid taking, or seek proper medical attention before taking, any number of potentially adverse combinations of medication identified by the reader. This indication may be provided visually, such as through use of the screen 874, audibly through use of the speaker 876, and/or tactility through use of, for example, a vibration device (not shown), and the like.

In one embodiment, the emission profiles 882 and associated identifying information 884 are provided to the memory 868 upon manufacture of the reader 860. In another embodiment, the emission profiles 882 and the identifying information 884 are provided to the memory 868 from a storage in a server (not shown) accessible to the reader 860 via an integral communication module (not shown). Such communication module may allow access to the storage by any one of a number of well known wired or wireless communication means including Ethernet, USB, Wi-Fi (trade mark), Bluetooth (trade mark), CDMA or GSM cellular technologies and the like which the reader and server are configured to use. Updates of reader information may be made by programmed access of the storage on a periodic basis, or un-programmed access by a user on an as-desired basis. Alternately, updates may be made each time the reader 860 is used to ensure the information 884 associated with a given emission profile 882, including recommended dosage and adverse interaction data and the like, is current.

In addition to incorporating the fragments on or in a pharmaceutical, unique rare earth doped glass fragments may be incorporated in the packaging of pharmaceuticals. Additional benefits include more reliable drug dispensing and administration. For example, if each drug package includes security markings having a PL signature unique for the frequency and/or day or time at which the drug is to be taken, then an absent-minded patient can use a reader to ascertain if they need to take a drug or if they have already taken the drug for that time/day. This has applications in a home or in a healthcare facility for the administration of medication, and in a pharmacy for dispensing medication, and the like.

Another example relates to the food industry. Produce, such as fruit and vegetables (but also including tins, meat, milk, yogurt, and such like), can be marked using glass particles such as the glass particles 150 in a fluid medium 155 shown in FIG. 11. The glass particles may be used instead of, or in addition to, adhesive stickers that are currently used on fruit. By spraying on the fluid medium, a unique glass particle having a unique PL signature can be applied to each type of produce item. For example, Gala apples may have one PL signature, Macintosh apples may have another PL signature, and so on. A checkout station may be equipped with a reader so that the produce can be automatically identified and the price obtained without having to manually read an adhesive label.

Glass particles having a unique PL signature may also be used in food products or additives such as, for example, peanuts. This would allow a person who is allergic to, or intolerant of, the food product or additive to ascertain whether the food product or additive is present or not.

Figure 26:
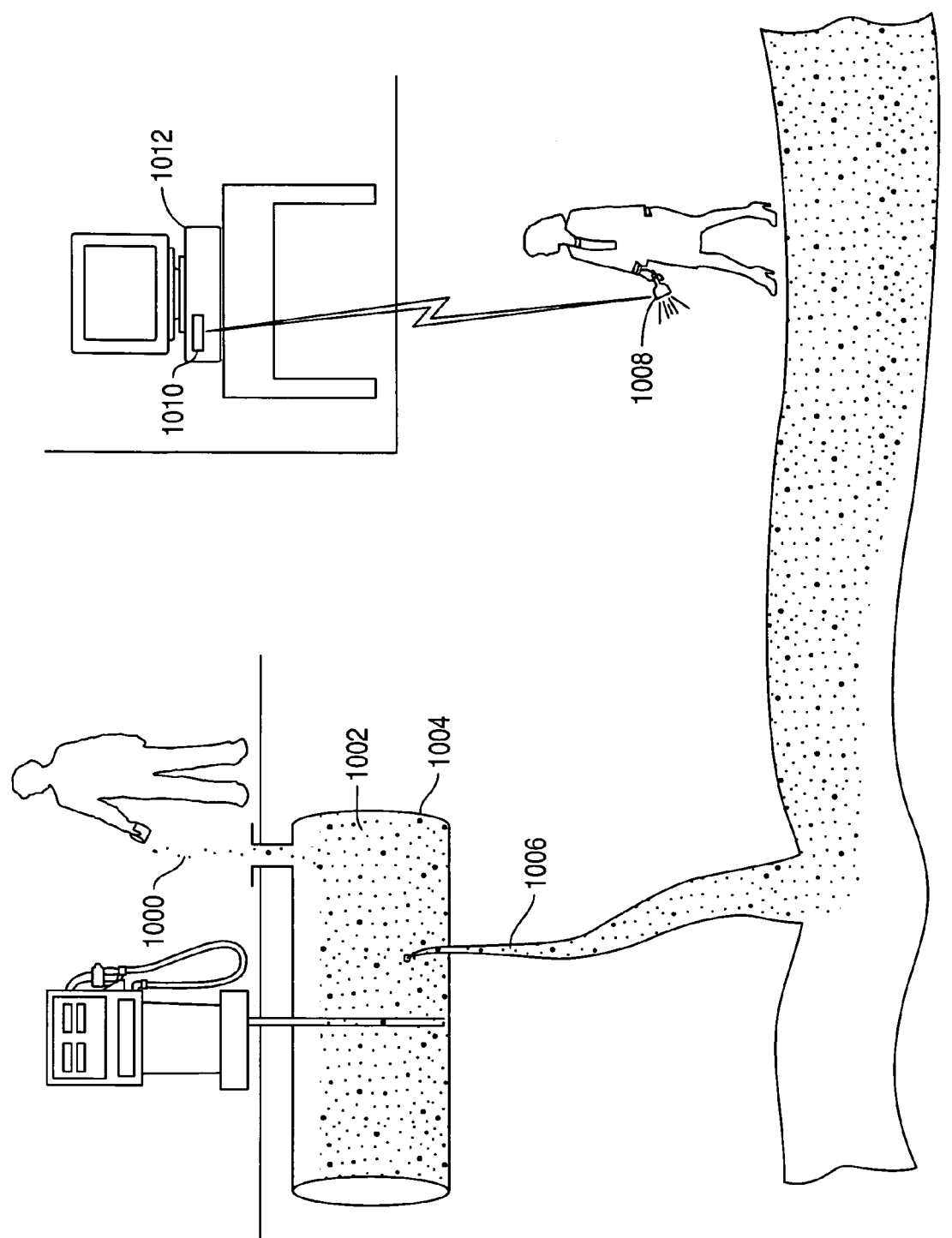
FIG. 26 illustrates fuel tagged with glass particles leaking from an underground tank and identifying source of the leak by detecting the glass particles.

In addition, the security markers can be used to track or identify source of a solid or liquid substance including clean and contaminated fuels, solvents, pastes, aerosols, paints, chemicals, detergents, metals, water and such like. For example, as shown in FIG. 26, glass powder 1000 comprising one or more billets may be added to a liquid such as gasoline 1002 in a fuel tank 1004 at a filling station. If the fuel tank 1004 subsequently develops a leak 1006, the powder 1000 can migrate to the leak and escape with the fuel 1002. A detector 1008 can then be used to excite the leaked powder 1000, detect resulting PL emission, and generate a PL signature which can be matched to one or more pre-determined PL signatures to identify the source and/or location of the leak 1006. The one or more pre-determined PL signatures may be stored in a storage 1010 associated with a remote server 1012 with information relating to the source (for example, the name and contact details of the person, whether an individual or an entity, owning, storing and/or supplying the fuel), the substance (for example, diesel) and such like. Access to the remote server 1012 may be obtained by the detector 1008 using any one of a number of well known wireless technologies such as Wi-Fi (trade mark), Bluetooth (trade mark) and GSM and/or CDMA and the like. Alternately, the remote server 1012 may be connected to the detector 1008 via, for example, a local area network, a USB connection and the like. Likewise, one or more of the one or more pre-determined signatures may be stored in a storage (not shown) in the detector 1008 for directly identifying one or more particular substances and/or their source and such like. Once determined, the identified source may be contacted and appraised of the leak including, possibly, location of the leak and/or where the leaking material was detected.

Similarly, environmental pollution and unauthorized dumping of waste can be detected and monitored by incorporating fragments of a billet into a waste material. Each large waste-producing factory may be assigned a unique PL signature, and required to incorporate glass fragments having that signature into all waste produced. If this waste is detected in an area that should be free of pollution then the source of this waste can be identified and, where appropriate, notified by a proper agency or authority.

Likewise, this tracking function can be applied to people, animals, weapons, explosives, medical instruments, pollutants, and watercourses. It can also be applied to any article or substance generally which moves, and which motion is to be followed, such as blood in the human circulatory system and food in the human digestive system.

Figure 27:
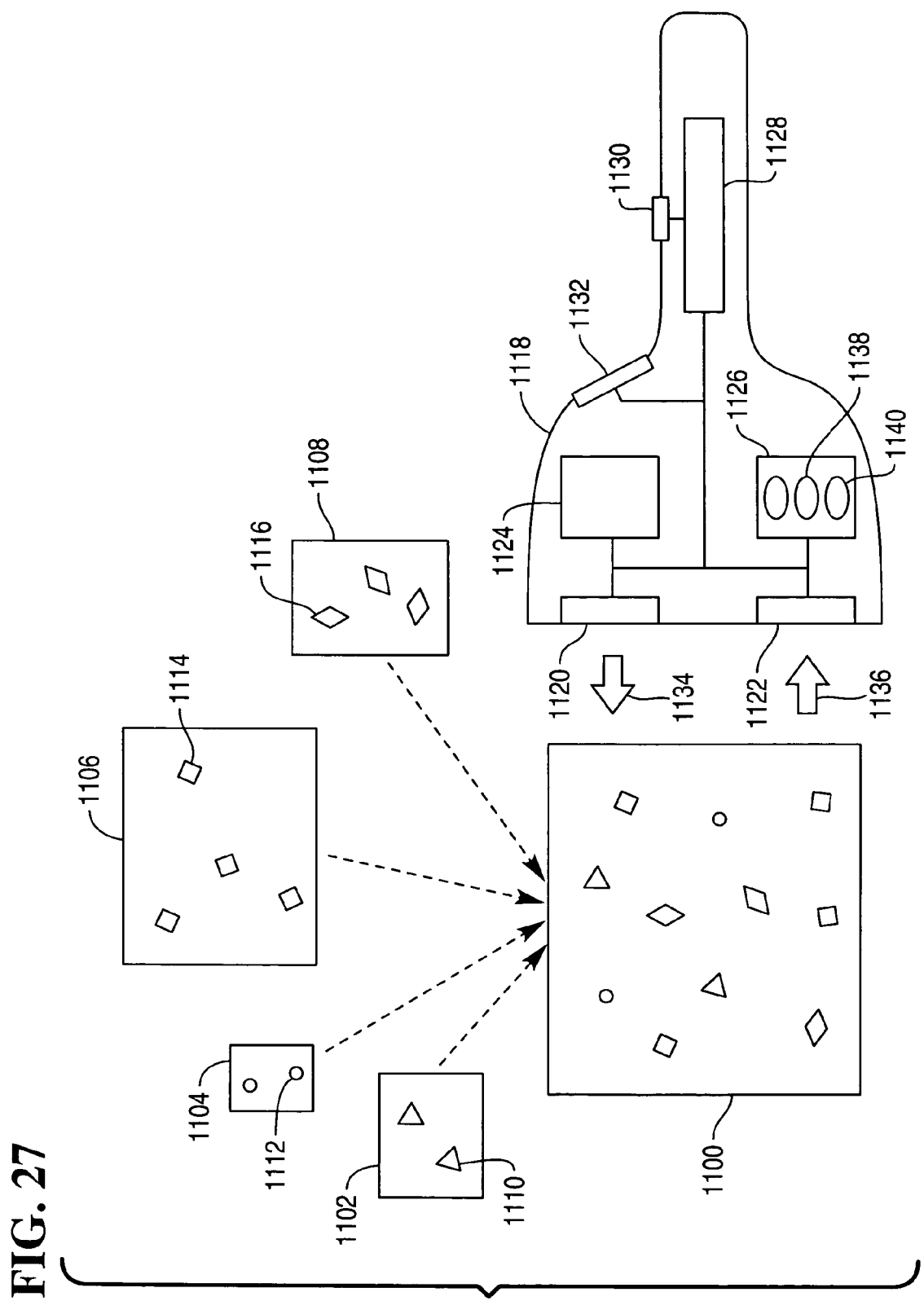
FIG. 27 illustrates a system for determining a component of a medium.

In addition, security markers can be used to identify a component of a multi-component medium. For example, as shown in FIG. 27, a medium 1100 may be manufactured using four components 1102, 1104, 1106 and 1108, where each of the four components 1102, 1104, 1106 and 1108 incorporates a unique marker 1110, 1112, 1114 and 1116 with known, unique PL emission. A reader 1118 can then be configured to, for example, identify the component 1106 of the medium 1100 by exciting the appropriate marker 1114 and detecting the respective, unique PL emission.

As further shown in FIG. 27, the reader 1118 may comprise an illumination source 1120, a detector 1122, a processor 1124, a memory 1126, a battery 1128, a switch 1130 and a display 1132. In use, the reader 1118 is activated via the switch 1130. After activation, the illumination source 1120 illuminates the medium 1100 at one or more illumination wavelengths 1134, the one or more illumination wavelengths 1134 being associated with one or more excitation wavelengths of the security marker 1114 for which the reader 1118 is configured to read. Upon illumination and/or at some defined time thereafter, the detector 1122 detects emission at one or more emission frequencies 1136 expected from the security marker 1114 in response to the one or more illumination wavelengths 1134. Subsequently, the processor 1124 compares the detected emission with one or more emission profiles 1138 stored in memory 1126. If a match is found, this result is indicated on the display 1132. If no match is found, this result is also indicated on the display 1132.

Displaying the result of a match may further include displaying information 1140 pertaining to the matched component 1106. The information 1140, which is also stored in the memory 1126, may include trade and/or technical name, chemical composition, manufacturer, manufacturing process, manufacture date, reactivity, toxicity, mechanical properties, thermodynamic properties, and the like. Likewise, displaying the result of a non-match may further include displaying some or all of the information 1140 associated with the component 1106 for which the reader 1118 is configured to read, along with an indication of its absence from the medium.

In additional embodiments, the reader 1118 may be configured to simultaneously identify more than one of the components 1102, 1104, 1106 and 1108 of the medium 1100. In such case, an indication of each identified component may be displayed on the display 1132, with or without some or all of the associated information 1140. Further, in case no match is found, an indication of each of the components 1102, 1104, 1106 and 1108 not found may be displayed on the display 1132, with or without the respective, associated information 1140.

In another embodiment, one or more emission profiles and any associated information, including emission profile 1138 and its associated information 1140, may be stored in a remote data store (not shown). In such case, a communication device (not shown) associated with the reader 1118 may be used to download the emission profile 1138 and associated information 1140 for a component 1106 to memory 1126, thereby configuring the reader 1118 to identify the compound 1106.

In further embodiments, the reader may be a "dumb" device which illuminates a medium, detects resultant emission, and sends the detected emission to a remote server via a wired or wireless communication device for remote processing and/or identification of one or more components.

Figure 28:
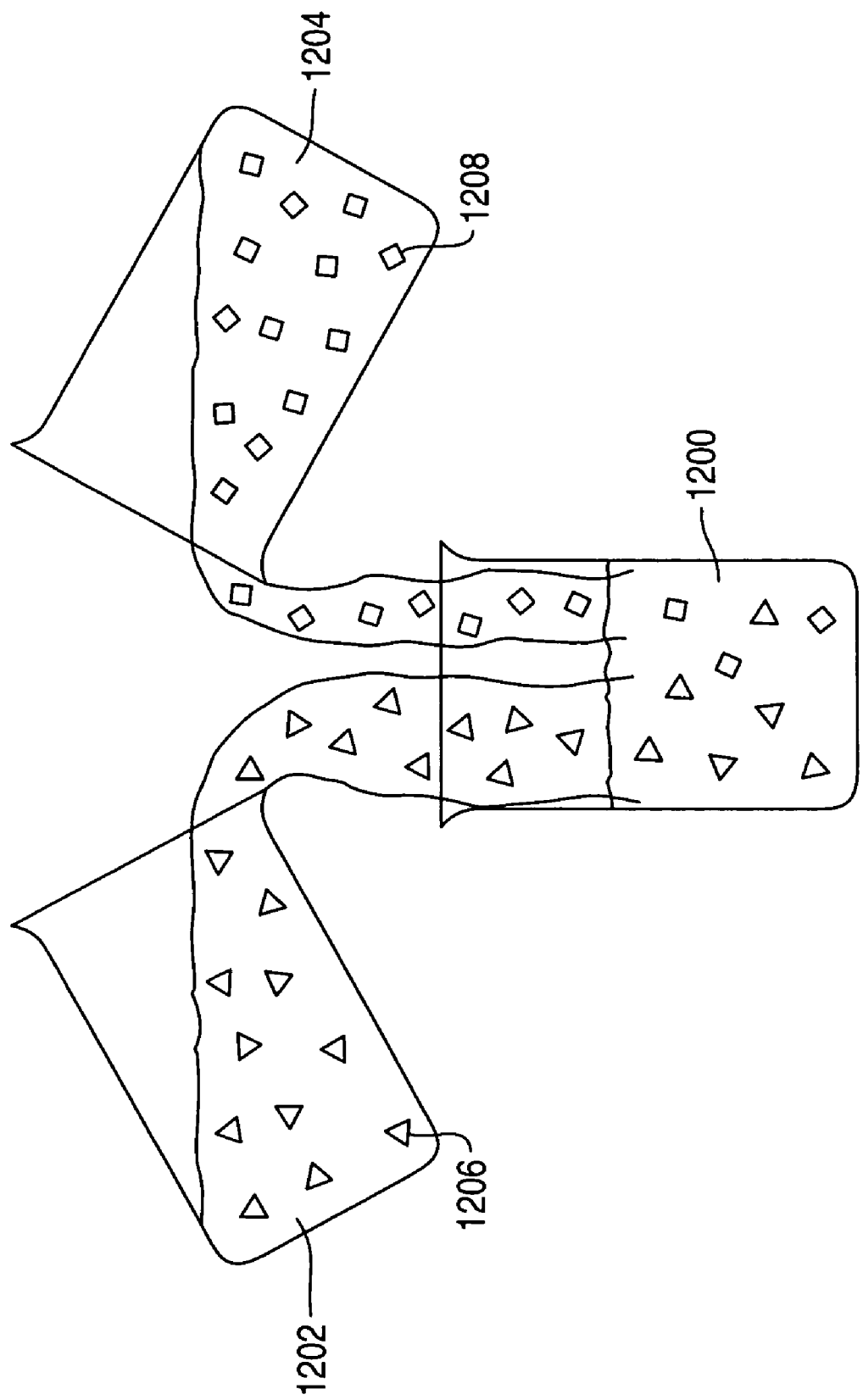
FIG. 28 illustrates a mixture of two fluids incorporating glass particles.

In another aspect, security markers may be used to determine the concentration of two or more fluids or solids in a multi-component medium, such as a mixture 1200 shown in FIG. 28. For example, if two different composition or source fluids 1202 and 1204 are mixed, then each fluid can incorporate glass fragments having unique PL signatures. A first set of fragments 1206 having a first PL signature can be suspended in the first fluid 1202, and a second set of fragments 1208 having a second PL signature different from the first can be suspended in the second fluid 1204. When the two fluids 1202 and 1204 are combined, the resulting mixture 1200 will contain each of the glass fragments 1206 and 1208 in proportion to the amount of each fluid 1202 and 1204 in the mixture 1200.

Figure 29:
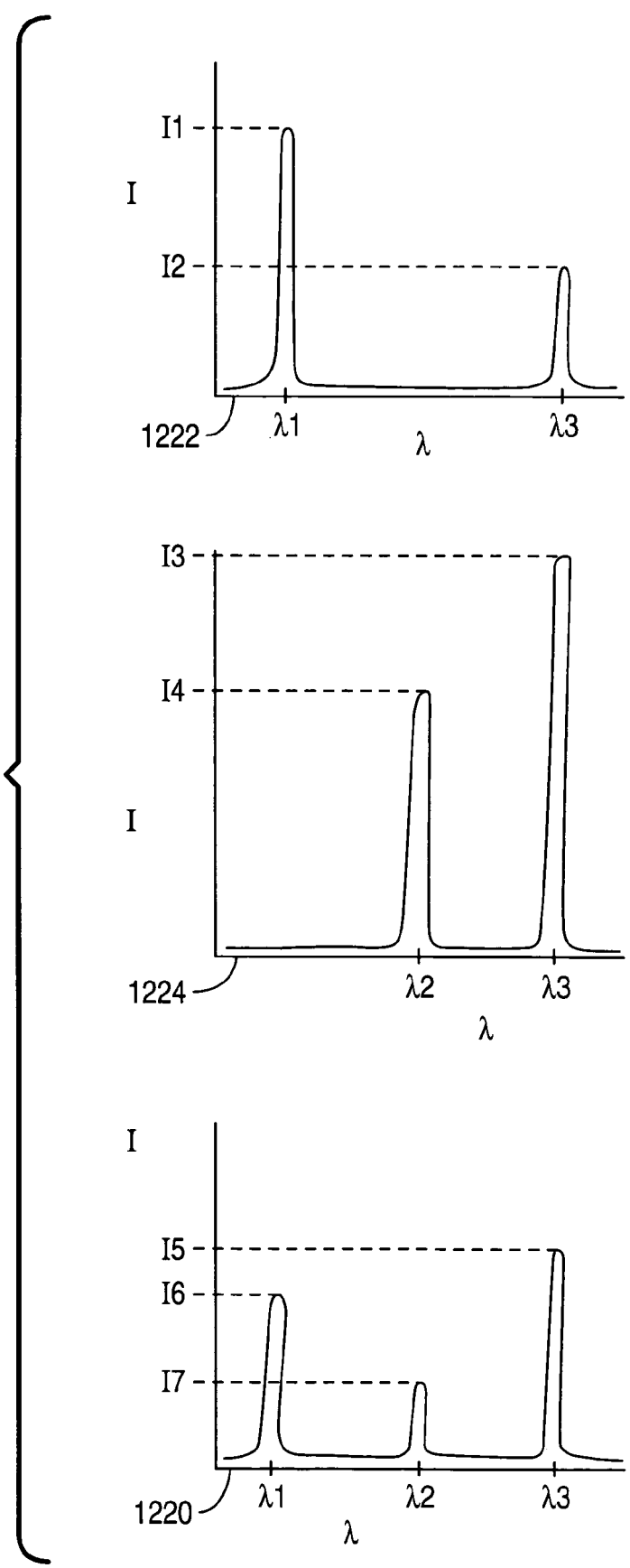
FIG. 29 illustrates photoluminescent signatures of the two fluids and resultant mixture of FIG. 28.

To determine the concentration of a component, such as the first component 1202, the mixture 1200 is illuminated, and a composite PL signature 1220, shown in FIG. 29, is measured. The composite PL signature 1220 reflects the contribution from the PL signatures 1222 and 1224 of each of the respective fragments 1206 and 1208 in the mixture 1200 of the two fluids 1202 and 1204. After detection, the composite PL signature 1220 is processed to ascertain the contribution from the PL signature 1222 of the glass fragments 1206 in the first component 1202. Subsequently, the concentration of the first component 1202 in the mixture 1200 is calculated based on a comparison of one or more aspects of the composite PL signature 1220 and one or more aspects of the ascertained contribution of the PL signature 1222 of the glass fragments 1206 in the first component 1202.

In one embodiment, the intensity of emission at a wavelength unique to a given component is used to determine the concentration of that component in the mixture. For example, referring to FIG. 29, the intensity of emission $I6$ at wavelength $\lambda 1$ is compared to the intensity of emission $I1$ at wavelength $\lambda 1$ to determine the concentration of the first component 1202 in the mixture 1200.

In another embodiment, the intensity of emission at a wavelength unique to a given component is compared to the intensity of emission unique to one or more other components to determine the concentration of the given component in the mixture. For example, referring again to FIG. 29, the intensity of emission $I6$ at wavelength $\lambda 1$ is compared to the intensity of emission I7 at wavelength λ2 to determine the concentration of the first component 1202 in the mixture 1200.

In a further embodiment, the intensity of emission at a wavelength common to all of the components is used to determine the concentration of a given component in the mixture. For example, referring again to FIG. 29, the intensity of emission I5 at wavelength λ3 is compared to the intensity of emission I6 at wavelength λ1 to determine the concentration of the first component 1202 in the mixture 1200.

In additional embodiments, combinations of the above methods may be used to determine the concentration of one or more components in a mixture. Likewise, the concentration of each of the components of a mixture having more than two components may be determined. In addition, one or more aspects of emission including intensity, wavelength, decay time, and the like may be used to determine the concentration of each components of a multi-component mixture.

A similar identification can perform a trademark-like function, in identifying authentic goods. Without limitation, this would apply to toner cartridges, fuels, tires, and any fungible articles in which the identity of the manufacturer or supplier is important. One such example is integrated circuits. These may include a unique fragment to identify the manufacturer, or they may include serial numbers formed from fragments to identify the type of integrated circuit.

Security markers can also be included in ink used to tattoo people, so that a person can use a tattoo as a secure identifier, or to gain access to a restricted site or area.

Similarly, unique security markers can be included in military uniforms, thereby enabling identification of a soldier by the uniform that he/she is wearing.

In the case of treating the article 210 of FIG. 13 as a human, the tag 215, if exhibiting the proper PL signature, can act as an admission permit or key. Thus, tag 215 can grant admission to places or buildings. Or tag 215 can grant permission to use specific equipment such as computers and the like.

In another application, the article 210 of FIG. 13 can represent a person or other living being. One or more glass fragments 215 on or associated with that person or being each having a predetermined PL signature can then be used to provide information relating to specific characteristics, such as color-blindness, of that person or being.

In another application, the article 210 in FIG. 13 bears no visible tags, but rather is painted with a coating containing one or more glass fragments 215 as for the article 170 in FIG. 12, wherein the coating exhibits a predetermined PL signature when excited. Alternately, the coating is applied only to a portion of, or in a concealed location on, the article 210.

In another application, the glass fragments can cooperate with each other to provide information. For example, FIG. 14 illustrates a card 300, upon which is superimposed an imaginary grid. Distance D is pre-established by convention. If a glass fragment is positioned within a cell 205 of the grid, that cell is treated as a logical ONE. If a cell 205 is empty, that is, devoid of a glass fragment, then that cell is treated as a logical ZERO.

A reader (not shown) begins at a pre-established starting point, advances in steps of distance D, and determines whether a ONE or ZERO is present. A binary encoding system is thus established.

Alternately, glass fragments having two different PL signatures are used. Now the need to advance in units of D is eliminated, but can still be used if desired. If the two different PL signatures are A and B, then the sequence AABAABBB can be treated as 11011000, which is another system of binary encoding.

This principle can be extended. If N types of glass fragment are used, having N different PL signatures, then an alphabet of N characters is thereby made available.

As part of the above, or any other encoding schemes, one or more particular PL signatures, or sequences of signatures, can be used to indicate start and/or end of an encoding sequence.

In another embodiment, the glass fragments can be used to ascertain condition of an item, including changes thereof through abrasion, wear and such like. For example, as shown in FIG. 30*a*, an item 1300 comprises a laminated material having five layers, a first layer 1302, a second layer 1304, a third layer 1306, a fourth layer 1308 and a fifth layer 1310. Five different, rare earth doped glasses having five different, known PL signatures may be embedded in the item 1300. Glass 1312 is embedded in the first layer 1302, glass 1314 is embedded in the second layer 1304, glass 1316 is embedded in the third layer 1306, glass 1318 is embedded in the fourth layer 1308, and glass 1320 is embedded in the fifth layer 1310.

Prior to any wear occurring, only the PL signature of the glass 1312 in the outermost layer 1302 can be detected, presence of which indicates a first condition of the item, namely, that the item is either unworn, or only worn to a small extent. As shown in FIG. 30*b*, after the outermost layer 1302 is worn away, the PL signature of the glass 1314 in the next layer 1304 can be detected, indicating a second condition of the item, and so on. This is useful in applications where it is important to detect wear or damage to, for example, surfaces, substrates, coatings, structural members, roads, insulation, sheathing, and mechanical parts such as wheels, tires, gears, brakes, belts, bearings, shafts, rings, fasteners and the like. Knowledge of which layer or layers are worn and/or remain can be used to identify maintenance or replacement needs. Likewise, such knowledge can individually or in the aggregate, be used to predict wear and/or lifecycle, and therefore assist in the setting of maintenance and/or replacement schedules.

Figure 31:
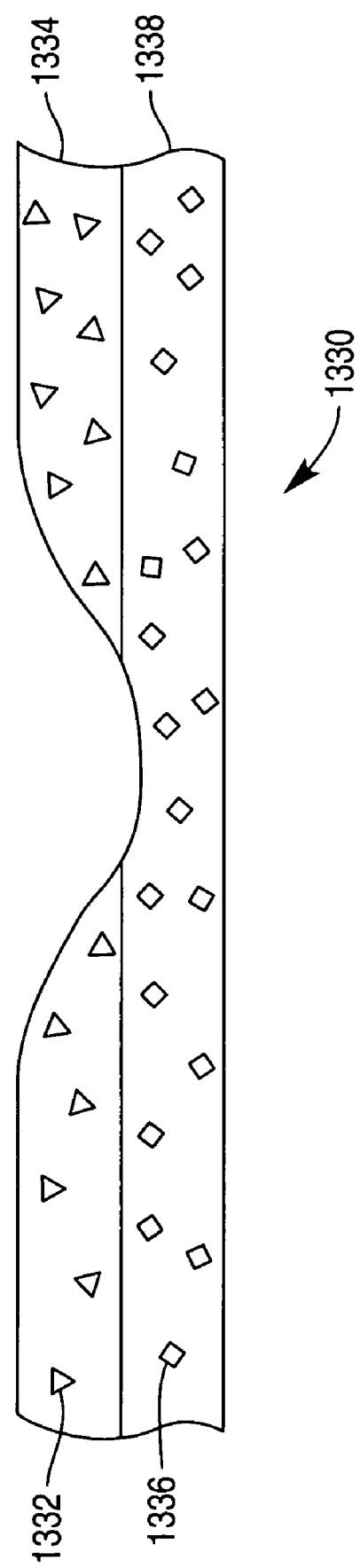
FIG. 31 illustrates uneven wear of an item incorporating a different type of glass particle in each of two layers of the item.

As shown in FIG. 31, uneven wear of an item 1330 can also be detected if, for example, predominantly one PL signature indicative of a first glass 1332 embedded in a first layer 1334 is present, but another PL signature indicative of a second glass 1336 embedded in a second layer 1338 is also present at one or more locations. This may provide early warning of wear and similarly influence maintenance and/or replacement schedule. When the glass is embedded in items such as airplane tires, this may provide a significant safety advance. In a similar way, a crack or fracture may be detected because proximate to the crack PL emission from security markers embedded in lower layers may contribute to the PL signature from the article being read. As the crack propagates, PL emission from additional layers may become evident and/or the intensity of previously identified emission may become stronger as more glass is exposed.

In another example, glass fragments may be embedded in one or more inner layers of an item. In such case, no abrasion, wear, cracking, fracture and the like may be indicated until one or more predetermined PL signatures associated with the embedded fragments are detected. Similarly, glass fragments may be embedded in one or more outer layers, or coatings, of an item. In such case, absence of one or more predetermined PL signatures may be used to indicate abrasion, wear, cracking, fracture, de-lamination and the like. Likewise, presence or absence of a predetermined PL signature, or variation in a property such as intensity of the signature, can be used to indicate cleanliness, fouling, and such like, as well as abrasion, wear, and such like, of an item.

These same principles can be applied to detecting whether an article has been tampered with. If the security markers are arranged as a tamper evident seal, then presence or absence of a predetermined signature can be used as evidence the seal is or has been broken.

A reader for detecting a condition of an item may be installed adjacent to the item to provide an on-line, continuous measurement of the item's condition. Alternately or additionally, a remote and/or handheld reader may be provided for a user to measure the condition on an as-needed or as-desired basis. In addition to non-destructive evaluation of condition of an item, such a reader can be used to assist in the non-destructive evaluation of failure of an item.

Security markers may also be encased within an active material ("encased markers") so that when the active material is in its normal state no PL signature is detected from the security markers. However, when the active material reacts or otherwise appropriately changes a characteristic, a PL signature can be recorded from the security markers. The active material may, for example, change state when raised to an elevated temperature, when melted, when worn down, when exposed to a particular atmosphere, chemical, or compound such as water, or after a predetermined amount of time has elapsed (such as a sell-by-date for food).

Having an encased marker that is detectable when raised to a predetermined temperature is useful when the encased marker is used on foodstuffs and food packaging that is liable to perish if raised above that predetermined temperature. If the encased markers are detectable when the temperature reaches the predetermined temperature, then an automated system including a reader can be used to determine if the food is at risk of perishing or becoming unsafe to consume. The encased markers may be applied directly to food (for example, encased markers may be adhered to fruit instead of an adhesive label) or to packaging for food. Similarly, a security marker may itself change its PL signature if its temperature is raised above a certain value. This allows automated reading of a security marker to ascertain if the certain value has been reached. To achieve this temperature change, temperature dependent sensitizers may be included in the security markers so that new transitions become allowed or forbidden when the certain value of temperature is reached. Another mechanism for achieving this is to use a host lattice that changes when the certain value of temperature is reached. This provides an indication of quality for the food associated with the encased marker.

In addition, security markers may be used in elections to ensure that each voter is only allowed to vote once. This may be performed by a voter using a personal ink, as described above. Likewise, the voting papers may include a security marker which is different for each election.

Security markers can also be used in a personal fluid for, for example, (i) marking possessions, or (ii) resisting attacks. In both examples, small fragments of security markers are suspended in a carrier which may be applied as, for example, a spray such as an aerosol or mist, or a liquid through means such as brushing, dipping, pouring, and such like.

Figure 32:
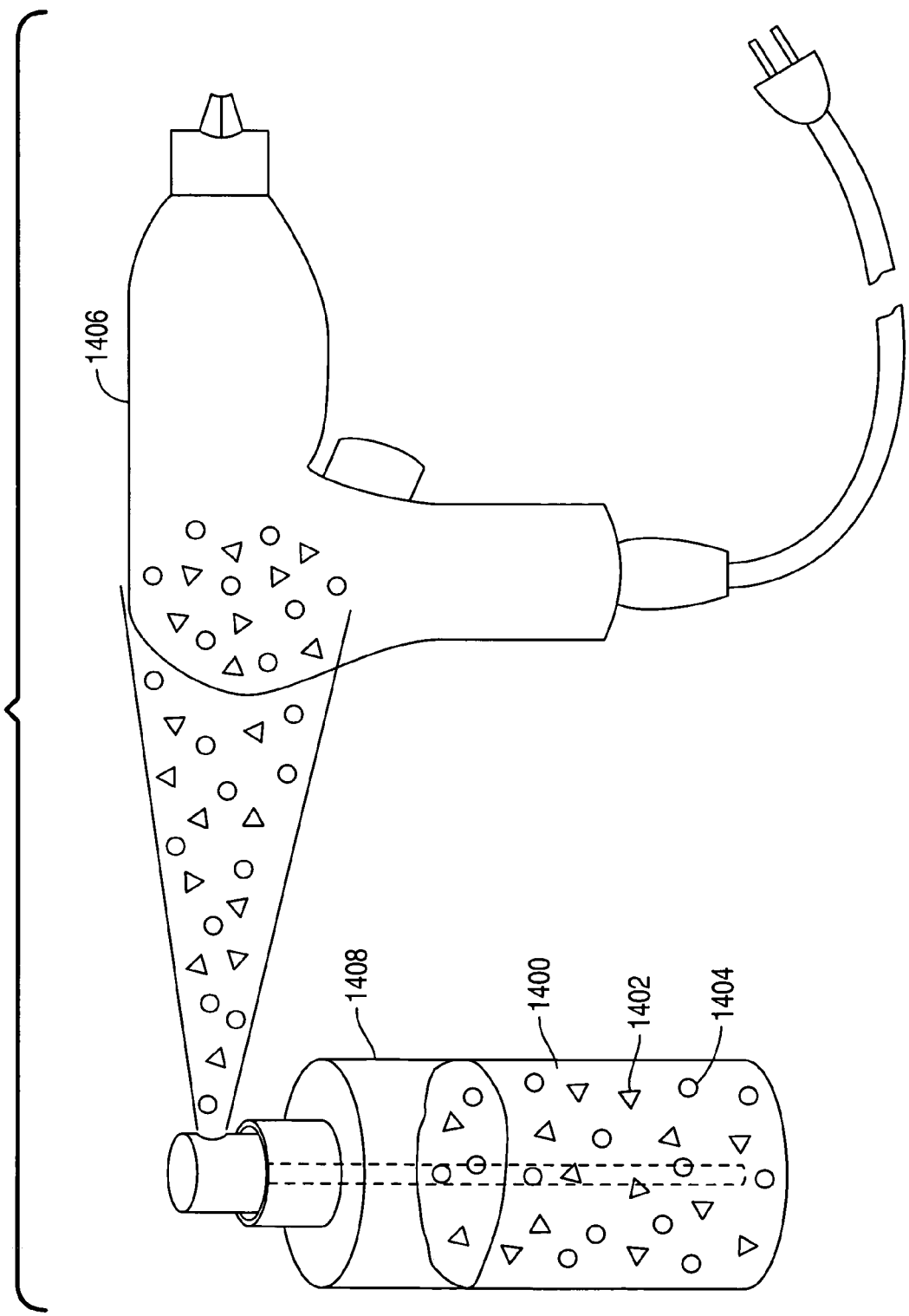
FIG. 32 illustrates a power tool marked by spraying with a fluid incorporating glass particles.

In the marking possessions example, the personal fluid may be a clear adhesive carrier 1400 in which small fragments 1402 and 1404 of security markers are suspended as illustrated in FIG. 32. In such case, the fragments 1402 and 1404 could all have the same individual or collective PL signature, which is unique to a person. To mark an item, for example a power tool 1406, a user sprays the adhesive carrier 1400 incorporating the fragments 1402 and 1404 on the item using a sprayer 1408. The item can subsequently be identified by reading the applied carrier to ascertain the PL signature of the incorporated security markers unique to the person.

In the resisting attacks example, the personal fluid may be a colored ink (perhaps also having a foul smell), that includes security markers having a PL signature associated with criminal activity. If a person is attacked or a crime is perpetrated against that person, then the person can spray the assailant with the personal spray. This will allow law enforcement officers to track and/or identify the assailant as having committed or attempting to commit a crime against the person.

Further, the security markers may be incorporated into conventional defensive sprays. As described above in the resisting attacks example, the security markers may include some PL signature associated with a person, to allow law enforcement officers to associate the person with the assailant. This can also be applied to home, store, bank, or other protection systems. Such a system could include a spray that sprays any area of the home, store or bank that is compromised by an attack so that the attacker and/or any object stolen or compromised would be covered by the spray.

In another such case, security markers may be incorporated into an ink carrier that is used to stain banknotes in the event of an attempted theft at a store, bank, or self-service terminal (SST) such as an ATM, and such like. Conventional banknote staining systems are sold by a number of vendors, including Fluiditi (trade mark). Incorporation of the security marker would help law enforcement officers to trace banknotes that were stolen and stained because the stained banknotes would have a unique PL signature associated with, for example, the owner of the store, bank, or ATM. Likewise, presence of such security markers as indicated by their PL signature may be used to manually or automatically reject banknotes presented to a store, bank, or SST such as an ATM, and the like. Similarly, operation of the ATM may be disabled upon detection of the presence of such security markers and/or proper authorities may be automatically or otherwise notified.

In one embodiment a personal reader may be provided to a person, where the reader is operative to identify the PL signature of one or more security markers unique to that person. Alternatively, a generic reader may be provided to one or more persons, which is operative to search a database to ascertain identity of a person associated with a read PL signature. Some or all of such a database may be incorporated in a memory in the reader, or may exist in a storage in a server accessible to the reader via one or more well known wired or wireless communication means including Ethernet, USB, Wi-Fi (trade mark), Bluetooth (trade mark), CDMA and GSM cellular technologies, and such like.

In all cases, a person associated with one or more security markers having a unique PL signature may be a natural person or an artificial person such as a corporation or other entity created by law.

Security markers may also be used to revoke a permission previously granted. For example, if someone has a token that includes security markers having a signature that allows a user to access a restricted area or function, then an additional security marker (having a different signature) can be applied (sprayed, pressed, injected, or such like) to the token to modify the token. When the modified token is subsequently read, the presence of the new PL signature can act to deny access to the user.

Another example of the use of security markers is in the field of guidance systems. In such use, PL signatures from luminescent security markers can be assigned to correspond to, or be otherwise associated with, guidance information. The guidance information can comprise absolute or relative location, direction, destination, elevation, speed limit, topography, time to a destination, and the like. The luminescent security markers can be incorporated into the surface of a roadway, railroad, curb, sidewalk, walkway, runway, step, door, deck, pavement, wall, sign, railing, floor, object, building element, and the like. Measured PL signatures of the luminescent security markers can, then, allow a pedestrian, driver, or automated vehicle, and the like to (i) manually or automatically navigate, and/or (ii) ascertain desirable guidance information such as advisory or mandatory speed limits and the like.

Figure 33:
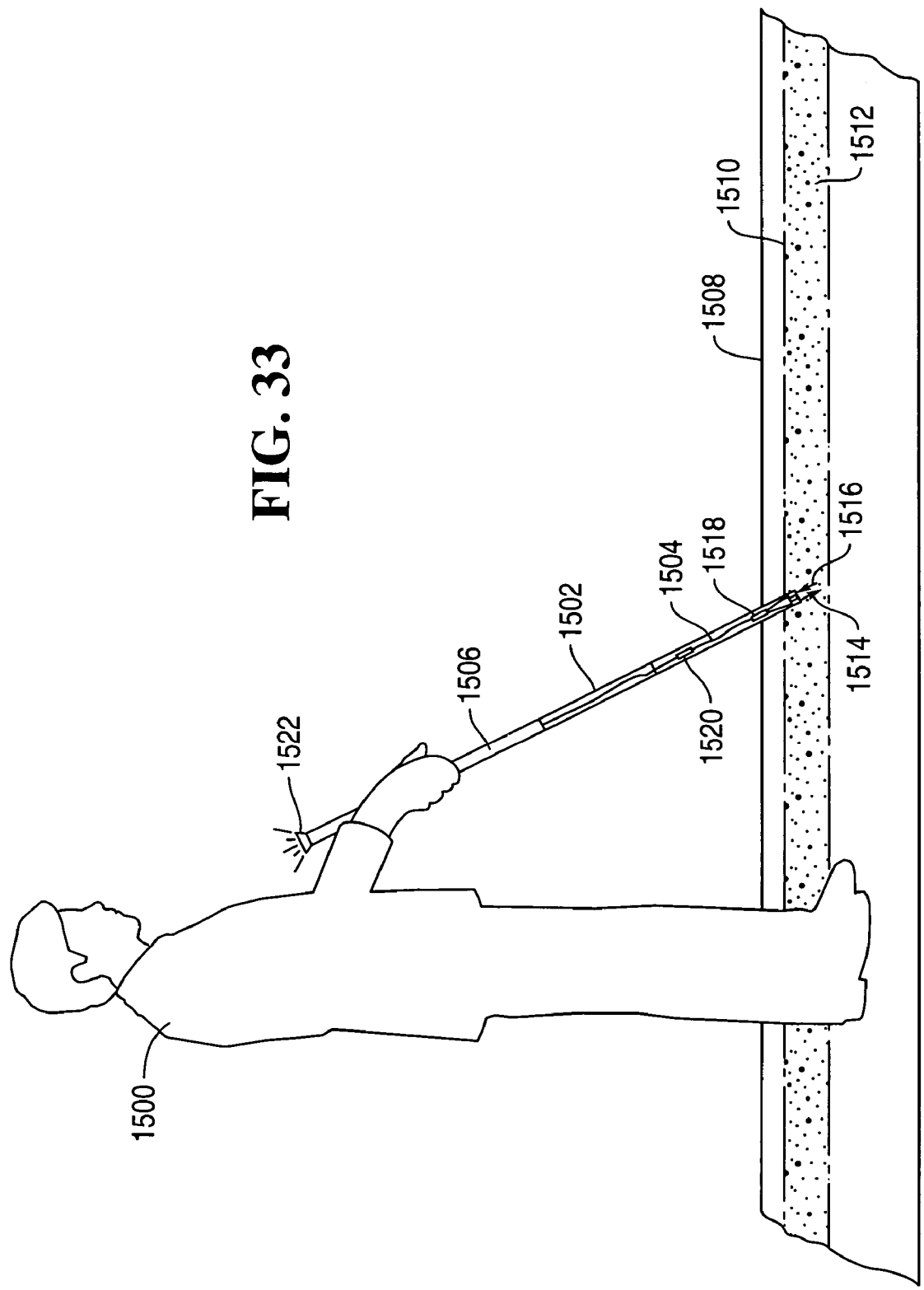
FIG. 33 illustrates a sidewalk incorporating glass particles, and a blind person holding a walking stick that detects the glass particles.

One specific example involves a blind or partially sighted person 1500 who has a walking stick 1502 fitted with a security marker reader 1504 and a data-to-speech system 1506, as shown in FIG. 33. The surface of a pavement such as a sidewalk 1508 includes a track 1510 incorporating luminescent security markers 1512 having PL signatures associated with guidance information such as, for example, location data indicating location of the pavement. In this example, as the blind person 1500 walks, he or she uses the walking stick 1502 to ascertain the location data.

The reader 1504 includes a light source 1514 to illuminate a region of the sidewalk corresponding to the track 1510, a detector 1516 to detect emission from the luminescent security markers 1512 in the track in response to the illumination, and a processor 1518 to control the various components of the reader 1506. The processor 1518 also processes the detected emission to ascertain a PL signature associated with the illuminated markers, and retrieves the associated location data using a look-up table stored in a memory 1520 in the reader 1504. The location data is then converted to speech and output to the blind person 1500 through a speaker 1522 included in the data-to-speech system 1506.

In other embodiments, alternative sensory output including, for example, auditory, tactile, text, and/or other visual output may be included with the stick 1502 and used to communicate the location information. Further, in another embodiment the lookup table may be stored in a remote database, access to which is obtained by the reader using any one of a number of well known methods such as Wi-Fi (trade mark), Bluetooth (trade mark), CDMA and GSM cellular transmission, and the like. Also, additional objects, such as buildings, doors, stairs, curbs, and such like can also have security markers embedded in them whose PL signatures can be used to denote their existence and location, describe their number and/or size, and the like, to further aid navigation by a blind or partially sighted person.

Figure 34:
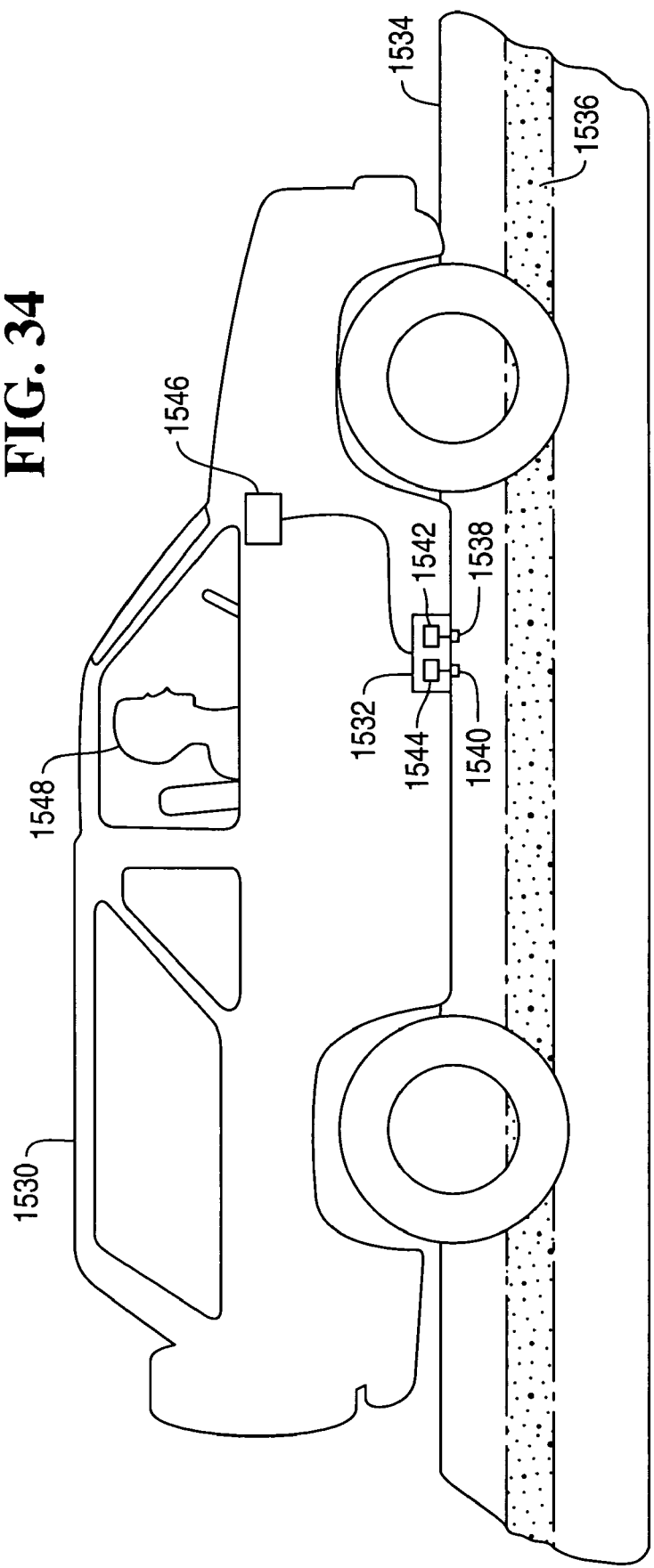
FIG. 34 illustrates a road surface incorporating glass particles, and a vehicle that detects the glass particles while the vehicle is moving along the road surface.

A second specific example, shown in FIG. 34, involves a moving vehicle 1530 fitted with a security marker reader 1532 aimed at a road surface 1534. Security markers 1536 in the road surface 1534 have one or more PL signatures associated with guidance information including, for example, the direction of the road, the destination of the road, the name and/or number of the road (for example, Interstate 70), the speed limit of the road, and the time to a destination at the posted speed limit. As the vehicle is moving, a light source 1538 in the vehicle's security marker reader 1532 illuminates the road surface 1534 at one or more illumination wavelengths, and a detector 1540 detects resultant emission from the incorporated security markers 1536. In this case, emission intensity and duration are detected. The detected emission intensity and duration data is processed in a processor 1542 in the reader 1532 to derive the related PL signatures, which are then used to obtain the associated guidance information from a local data store 1544. Output from the vehicle's security marker reader 1532 is conveyed to, for example, an entertainment center 1546 within the vehicle 1530 to provide an audible and visual readout to the vehicle driver 1548 and/or a passenger (not shown) of the guidance information indicated by the one or more PL signatures of the security markers 1536 in the road surface 1534, thereby allowing the driver 1548 to navigate to a desired destination.

In one embodiment the PL signatures and associated guidance information are loaded into the local data store 1544 upon manufacture of the reader 1532. In another embodiment, the PL signatures and associated guidance information are manually or automatically downloaded from a separate and possibly remote data storage device (not shown) via any one of a number of wired or wireless technologies on a periodic, or as-required and/or as-desired basis.

In another embodiment, an automated guidance system associated with an automated vehicle such as a robotic delivery system for use in factories, hospitals, and such like can use information corresponding to PL signatures read from markers embedded in the floor, walls, fixtures, assembly line, and the like of a shop or hospital, to, for example, fully or partially navigate the shop or hospital.

In another embodiment, illustrated in FIG. 15, a kit 400 is provided. The kit 400 contains a number of glass beads 405. A detector 410 is provided, such as that described in connection with FIG. 16, to detect a specific PL signature of each of the glass beads 405. In ordinary practice, the detector 410 will be dormant when contained within the kit 400. All components of the kit 400 are contained in a common package, such as a thermo-formed blister pack 420.

The detector 410 can compare the PL signature obtained from a sample bead 405 with stored data indicating that signature. Or the detector 410 can be equipped with one or more additional beads, and compare the PL signature of one or more of those beads with the PL signature of a sample bead 405.

FIG. 16 illustrates one embodiment of the detector 410 of FIG. 15. The detector 410 includes a disc 412, having a central hole 414, which engages with an axle 416. The disc 412 carries a collection of glass beads 405 each incorporating one or more rare earth dopants. The disc 412 contains an indexing hole 418, which engages with an indexing pin 420, allowing the detector 410 to position a desired one of the glass beads 405 at a scanning station indicated by dashed box 422.

For example, assuming that a top side of the disc 412 is defined, then the beads 405 can be identified by their position (first, second, third) in the clockwise direction relative to the indexing hole 418.

Of course, the disc 412, or other carrier, may carry a single bead 405.

Scanner 410 may be controlled remotely, as by a computer 424, which selects a specific bead 405, or sequence of beads, for scanning.

In another embodiment, additional PL signatures are added to a scanned PL signature to thwart hackers from intercepting and identifying the scanned PL signature. The additional PL signatures may be stored in and retrieved from a memory of a scanner, or computer associated with the scanner, or generated using the detector 410 shown in FIG. 16. Further, the additional PL signatures may be randomly retrieved and/or generated to further thwart hackers.

Figure 17:
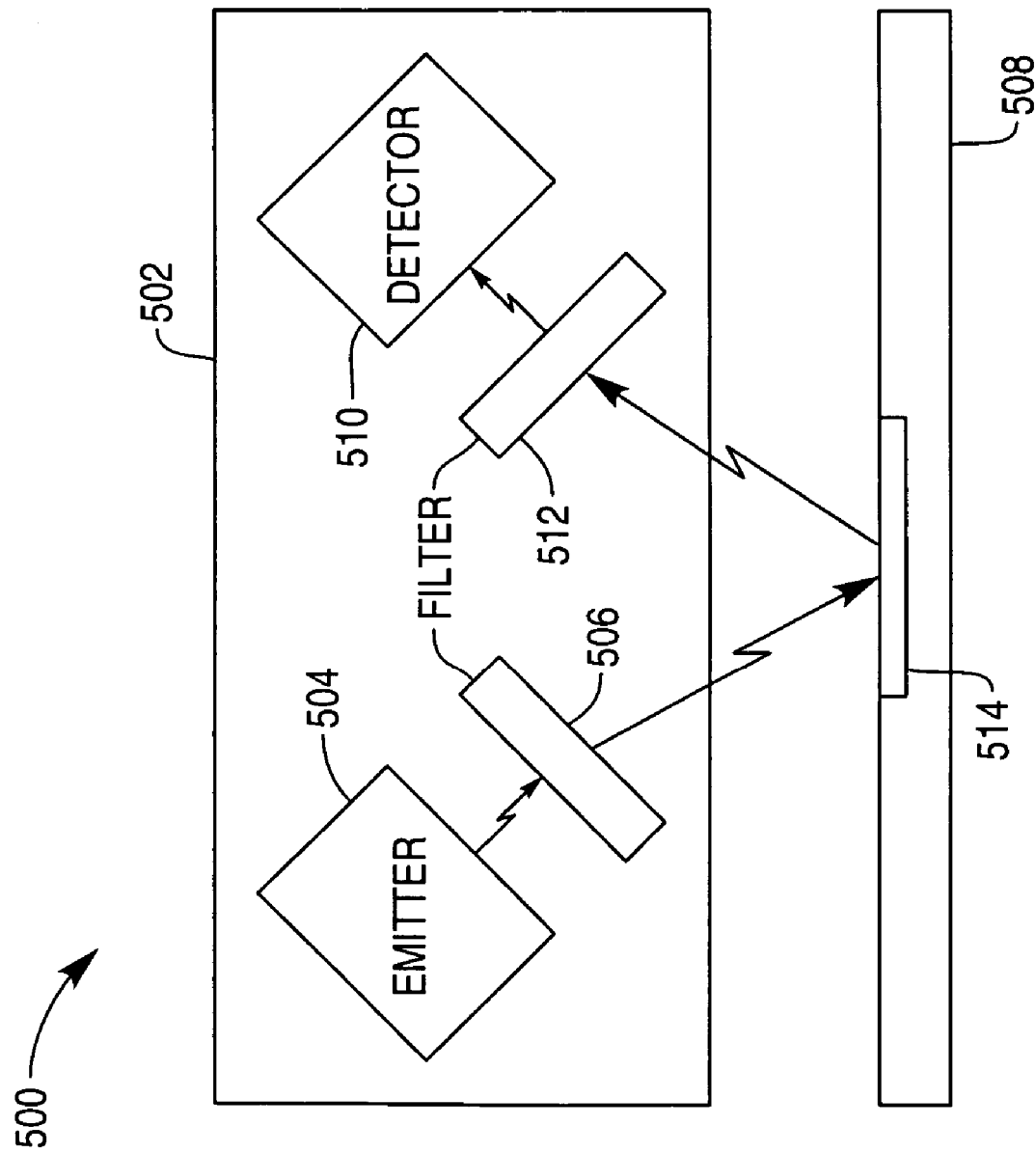
FIG. 17 is a block diagram of a sensor arrangement.

FIG. 17 illustrates one embodiment of a sensor 500 for detecting information encoded in accordance with the present invention. The sensor 500 includes a housing 502 in which are provided an emitter 504, for example a light emitting diode (LED), at the output of which is provided a narrow band filter 506. The narrow band filter 506 allows only a very narrow, pre-determined range of wavelengths to be passed. As an example, the filter could be selected to allow a narrow band centered on a wavelength of 465 nm to pass through it and toward an item 508. The sensor 500 also includes a detector 510, such as a photodiode. At its input is a narrow band filter 512 that allows only a very narrow, pre-determined range of wavelengths to pass through it. As an example, the filter 512 could be selected to allow light centered on a wavelength of 615 nm to reach the detector 510.

When the sensor 500 is in use, light is emitted from the emitter 504 and passes through the first narrow band filter 506 onto a security marker 514 associated with the item 508, the security marker 514 comprising a carrier incorporating one or more rare earth dopants. A portion of the filtered light is then absorbed by the security marker 514 which, if it matches the energy levels of the security marker 514, causes it to photoluminesce. PL emission from the security marker 514 then passes through the second filter 512 to the detector 510 for detecting presence or absence of the filtered wavelength of light.

In another embodiment, a PL signature from a security marker associated with an item has multiple characteristics that can be identified. These include intensity of PL emissions at one or more wavelengths, and a time period over which the emissions decay at the one or more wavelengths, among others. In the event that the PL signature has the expected characteristics, the item is identified as being authentic. In the event that PL signature is not as expected, or one or more characteristics are not within an acceptable range of the expected response, the item is identified as being a potential counterfeit.

In another embodiment, multiple, different security markers, each with a different PL signature, are associated with an item. In such case, characteristics of the PL signature of any combination of the respective security markers, including a composite PL signature from all of the respective security markers, can be used for any of the purposes described herein.

In a further embodiment, one billet of glass incorporating one or more rare earth dopants is fabricated and its PL signature is ascertained. This is repeated for numerous billets, to develop a database of doped glasses and their PL signatures.

In one approach, every time a new billet is fabricated, its PL signature is compared with existing signatures in the database. If the new PL signature does not deviate sufficiently from an existing signature, the corresponding billets are treated as interchangeable. Since the PL signatures can, in effect, be treated as numbers, a simple formula can be used to define similarity between the signatures. For instance, if one PL signature has intensity I, then another PL signature having an intensity of 0.95 I can be defined as similar.

In another embodiment, no database is used. A glass foundry fabricates a billet of glass incorporating one or more rare earth dopants, ascertains its PL signature, divides the billet into fragments, powder, or such like, and delivers the fragments/powder to a customer. In such case, the foundry may include data indicating the ascertained PL signature, or the customer may rely on his own testing to ascertain the PL signature. In either case, the foundry may not retain data indicative of the PL signature, or if it does retain such data, keep it secret.

Thus, the customer obtains a collection of rare earth doped glass fragments which, as a practical matter, are difficult to replicate. A given composition, producing a given PL signature, is difficult to copy to produce an identical composition which produces the same PL signature, for several reasons. One is that the process by which the billet is formed including heating, cooling, and heat treatment steps such as annealing (if any), affect its PL signature, and those processing parameters are not apparent from the composition. A second reason is that any approach to replicate the fragments would typically be based on trial-and-error for which, depending on the number of constituents comprising the doped glass, the trials required could run into the millions.

The spectral emissions of various marker samples have been investigated. As an example, FIG. 18 shows a table of the emission wavelengths and intensities for various different excitation wavelengths for a security marker comprising approximately 3 mol % $EuCl_3$ when included in the borosilicate glass described above. By way of comparison, FIG. 19 shows the corresponding results for the $EuCl_3:6H_2O$ dopant, but when in solution.

From these Figures, it can be seen that for the doped glass the most significant excitation in terms of response intensity is at 395 nm, for which a non-dimensional intensity of PL emission is approximately 285 at 615 nm. At the same excitation of 395 nm, the non-dimensional peak in emissions intensity for the $EuCl_3:6H_2O$ is only approximately 86, and occurs at 592.5 nm rather than the 615 nm found for the doped glass. Hence, the spectral response of the doped glass security marker at 395 nm is significantly different from that of the $EuCl_3:6H_2O$ in solution. Also when the doped glass is excited at a wavelength of 415 nm, there is a corresponding output at 590.5 nm and 615 nm. In contrast, for the $EuCl_3:6H_2O$ in solution, there is effectively no photoluminescence at this excitation wavelength. Again, this demonstrates that there is significant and measurable difference caused by the incorporation of a rare earth dopant in a carrier such as borosilicate glass.

Because rare earth ions have well defined and relatively narrow, non-overlapping PL emission bands, this means for many applications it is possible to detect a security marker comprising a carrier incorporating a rare earth dopant using a single, discrete, pre-determined excitation wavelength, and likewise a single, discrete, pre-determined detection wavelength. For example, for the $EuCl_3$ doped borosilicate glass described above, an emitter filter could be selected at 395 nm, and a detector filter could be at 615 nm. Alternatively, a plurality of excitation and detection wavelengths could be used. To do this, a number of different, suitable, emitter filters could be selected, along with a plurality of corresponding detector filters. The various frequency filters could be arranged as indicated by FIG. 1 to allow the simultaneous measurement of PL emissions at various different wavelengths. It may also be beneficial to measure PL emissions at wavelengths for which no PL emission should be present to ensure that a broadband response is not being detected.

A further advantage of the discrete nature of PL emissions of rare earth ions is that a number of species can be combined into the one product for improved security. For example 3 mole % Eu can be combined with 3 mole % Tb, not precluding other rare earths at different percentages, and/or more than two. Because the response of the various different dopants is relatively discrete, detection of each is simplified. A further advantage is that many rare earth ions are excited at wavelengths conducive to existing laser diode technologies. This makes in situ excitation possible because the excitation source is compact, robust and long-lived.

Furthermore, incorporating the rare earth dopants into a suitable carrier, and in particular the glass beads described herein, means that the security marker in which the invention is embodied is extremely stable under adverse chemical, environmental and physical (e.g., wear) conditions, thereby ensuring that it has a long lifetime compared to conventional dyes.

A skilled person will appreciate that variations of the disclosed arrangements are possible without departing from the invention. For example, while only a few rare earth ions have been specifically described, it will be appreciated that there is a wide range of PL rare earth ions that could be used. The number of permutations available is therefore greatly enhanced. In addition, while some rare earth ions emit in the UV and IR ranges, it is preferred for some applications that both the excitation radiation and the emitted radiation are within the visible range, which is within a wavelength range that is visible to the unaided human eye. Accordingly, the above description of a specific embodiment is made by way of example only and not for the purposes of limitation. It will be clear to the skilled person that minor modifications may be made without significant changes to the operation described. In other embodiments, other luminescent carriers may be used that do not rely on rare earth doping, for example carriers including phosphorescent material, dyes, or such like; and other mechanisms for stimulation emission of radiation may be used, for example, electro-luminescence, bio-luminescence, chemi-luminescence, and such like.

In other embodiments, complex PL signature matching algorithms may be used to take account of errors due to rounding, and such like. For example, multi-dimensional vector mapping may be used, where intensities at multiple frequencies of interest may be represented as a single multi-dimensional vector. Other pattern matching techniques that could be applied to comparing a PL signature with pre-stored PL signatures will be evident to those of skill in the art.

What is claimed is:

1. A method of indicating a condition of an item, the method comprising:
    illuminating the item to excite one or both of a first and a second marker incorporated within the item, wherein the first and the second marker are incorporated at different locations within the item;
    detecting photoluminescent emission from one or both of the first and the second marker in response to the illumination;
    processing the detected photoluminescent emission to generate a photoluminescent signature, wherein the generated photoluminescent signature comprises a rate of change in photoluminescent emission versus time;
    comparing the generated photoluminescent signature with a first photoluminescent signature comprising a rate of change in photoluminescent emission versus time associated with the first marker and a second photoluminescent signature comprising a rate of change in photoluminescent emission versus time associated with the second marker, wherein the second photoluminescent signature is different from the first photoluminescent signature;
    indicating the item is in a first condition when the generated photoluminescent signature corresponds to the first photoluminescent signature; and
    indicating the item is in a second condition when the generated photoluminescent signature corresponds to the second photoluminescent signature.

2. The method of claim 1, wherein the first and the second marker are located at different depths into the item, and indicating the item is in a first or a second condition includes indicating a depth of the marker having a photoluminescent signature corresponding to the generated photoluminescent signature.

3. A method of marking an item to indicate a condition of the item, the method comprising:
    locating a first marker having a first photoluminescent signature at a first location in the item, presence of the first photoluminescent signature being indicative of a first condition of the item; and
    locating a second marker having a second photoluminescent signature different from the first photoluminescent signature at a second location in the item, the second location being different from the first location and presence of the second photoluminescent signature being indicative of a second condition of the item,
    wherein the first photoluminescent signature comprises a first rate of change in photoluminescent emission versus time and the second photoluminescent signature comprises a second rate of change in photoluminescent emission versus time.

4. The method of claim 3, further comprising:
    optically masking the second marker to ensure (i) minimal excitation reaches the second marker, or (ii) minimal photoluminescence from the second marker is emitted from the item, so that if substantial photoluminescence from the second marker is emitted from the item then the item is in the second condition.

5. The method of claim 4, wherein optically masking the second marker is achieved by locating the second marker in an optically opaque portion of the item.

* * * * *